United States Patent [19]

Hatano et al.

[11] Patent Number: 5,432,556
[45] Date of Patent: * Jul. 11, 1995

[54] CODING APPARATUS

[75] Inventors: Yoshiko Hatano, Asamura; Yoshinori; Ken Onishi, all of Nagaokakyo, Japan

[73] Assignee: Mitsubishi Denki Kabushiki Kaisha, Tokyo, Japan

[ * ] Notice: The portion of the term of this patent subsequent to Apr. 26, 2011 has been disclaimed.

[21] Appl. No.: 189,202

[22] Filed: Jan. 31, 1994

Related U.S. Application Data

[63] Continuation of Ser. No. 31,031, Mar. 11, 1993, Pat. No. 5,307,163, which is a continuation of Ser. No. 631,796, Dec. 21, 1990, abandoned.

[30] Foreign Application Priority Data

| Dec. 25, 1989 | [JP] | Japan | 1-335487 |
| Feb. 6, 1990 | [JP] | Japan | 2-26587 |
| Apr. 18, 1990 | [JP] | Japan | 2-100354 |
| Apr. 18, 1990 | [JP] | Japan | 2-100355 |
| Jul. 4, 1990 | [JP] | Japan | 2-179121 |

[51] Int. Cl.⁶ .............................................. H04N 7/12
[52] U.S. Cl. .................................... 348/415; 348/420; 348/390; 382/251; 358/432
[58] Field of Search .............. 348/405, 415, 420, 390; 358/432; 382/56

[56] References Cited

U.S. PATENT DOCUMENTS

| 4,302,775 | 11/1981 | Widergren et al. | 248/406 |
| 4,734,767 | 3/1988 | Kaneko et al. | 348/400 |
| 4,797,742 | 1/1989 | Sugiyama et al. | 348/407 |
| 4,814,871 | 3/1989 | Keesen et al. | 348/408 |
| 4,890,161 | 12/1989 | Kondo | 348/421 |
| 5,073,821 | 12/1991 | Juri | 348/405 |
| 5,170,264 | 12/1992 | Saito | 358/426 |
| 5,307,163 | 4/1994 | Hatano et al. | 348/415 |

FOREIGN PATENT DOCUMENTS

| 0207774 | 1/1987 | European Pat. Off. |
| 0310175 | 9/1988 | European Pat. Off. |
| 0296608 | 12/1988 | European Pat. Off. |

OTHER PUBLICATIONS

Frequenz, vol. 38, No. 10, Oct. 1984.
IEEE Transactions on Communication Technology, Dec. 1971.
1984 International Zurich Seminar on Digital Communications, Mar. 1984.
ICC 84, IEEE International Conference on Communications, May, 1984.
S. M. C. Borgers et al, "An Expt. Digital VCR with 40 Drums, Single Actuator & DCT-based Bit-Rate Reduction," vol. 34, No. 3.
Signal Processing of HDTV, Proceedings of the Second International Workshop on Signal Processing of HDTV, L'Aquila, 29th Feb. -2nd Mar. 1988, pp. 231-238.

Primary Examiner—Curtis Kuntz
Assistant Examiner—Minsun Oh
Attorney, Agent, or Firm—Wolf, Greenfield & Sacks

[57] ABSTRACT

A coding apparatus reduces a digital image signal. The coding apparatus includes a block formatting circuit for dividing the digital image signal into blocks of a plurality of picture elements, an orthogonal transforming circuit for transforming the blocks of plurality of picture elements into a plurality of coefficients, an adaptive quantizing unit for quantizing the plurality of coefficients with a quantization table, a calculating circuit that divides each block of the digital image signal into a plurality of sub-blocks and obtains a plurality of indexes, and a detecting circuit that obtains a maximum index and a minimum index from the plurality of indexes. Each index indicates a degree of change between the picture elements in a sub-block of the plurality of sub-blocks. The coding apparatus further includes a subtracting unit that obtains a difference between the maximum index and the minimum index, and a selecting unit that obtains the quantization table from a plurality of quantization tables according to the minimum index and the difference. As a result, the image quality of the background having little change in the signal is kept good.

21 Claims, 30 Drawing Sheets

W(M)   ( M=MAX{m,n} )

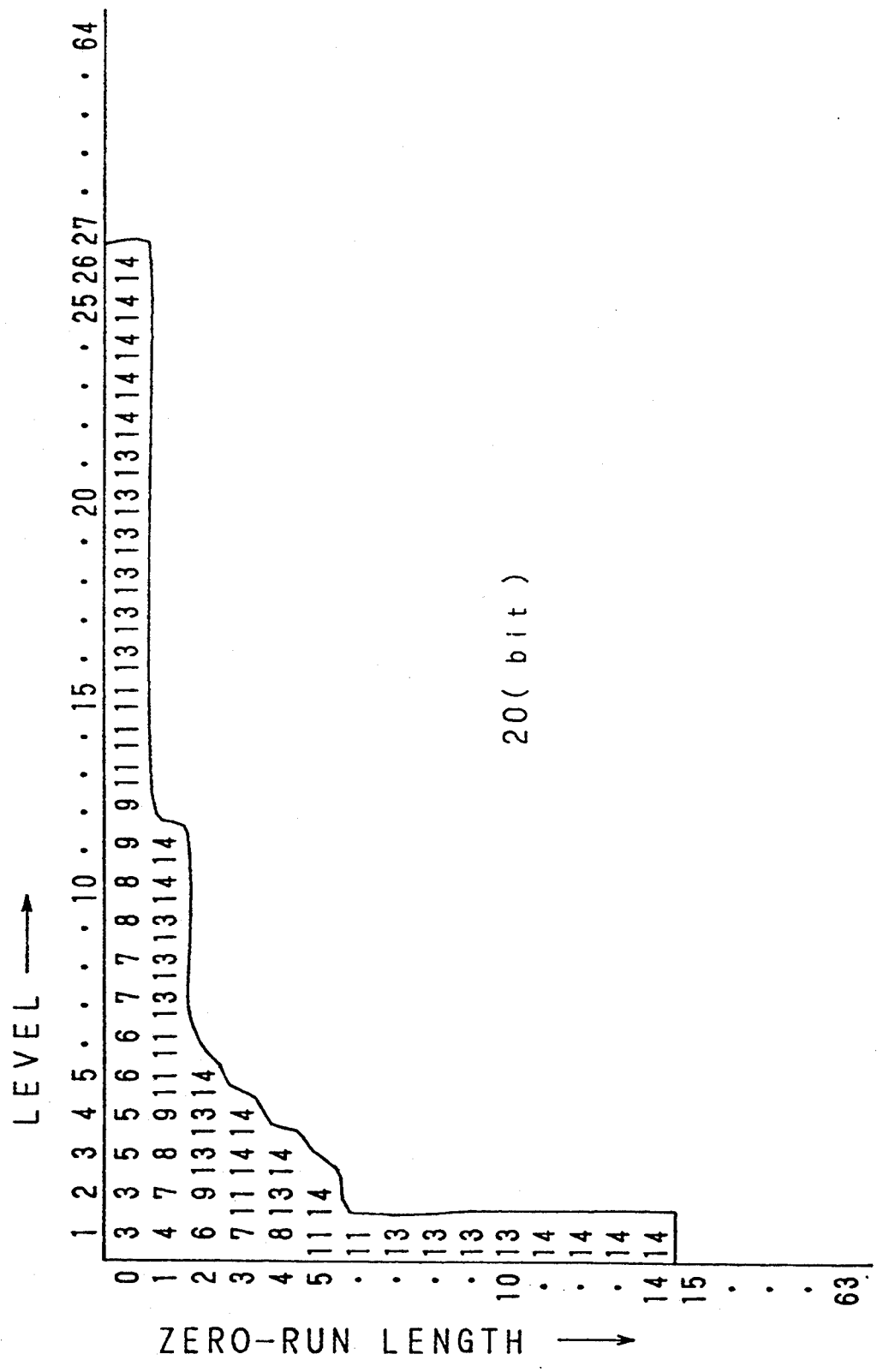

CODING APPARATUS

This application is a continuation of application Ser. No. 08/031,031 filed Mar. 11, 1993 now U.S. Pat. No. 5,307,163, which in turn is a continuation of Ser. No. 07/631,796 filed Dec. 21, 1990 now abandoned, (status, pending.)

BACKGROUND OF THE INVENTION

1. Field of the Invention

This invention relates to a coding apparatus designed to reduce the amount of data of digital image signal for use in a digital image signal recording apparatus such as a digital VCR, etc.

2. Description of Related Art

FIG. 1 is a block diagram showing the structure of a conventional coding apparatus disclosed, for example, in IEEE Transactions on Consumer Electronics, Vol. 34, No. 3 (AUGUST, 1988) under the title of "AN EXPERIMENTAL DIGITAL VCR WITH 40 MM DRUM, SINGLE ACTUATOR AND DCT-BASED BIT-RATE REDUCTION". Referring to this FIG. 1, a formatting circuit 1 divides an inputted digital image into a plurality of blocks and outputs the image signals of each block to a DCT circuit 2. The image signals of each block are subjected to Discrete Cosine Transform (hereinafter referred to as DCT) by the DCT circuit 2 which then outputs coefficients to a quantizing unit 3. The quantizing unit 3 holding a plurality of quantization tables having different quantization steps from each other selects the optimum quantization table in compliance with the coefficients and quantizes the coefficients in the block to output the quantized coefficients to a variable length coding unit 4. The variable length coding unit 4 performs variable length coding on the quantized coefficients, generating variable-length-coded coefficients to a buffer memory 5. The buffer memory 5 transforms the variable-length-coded image signal at a fixed rate and stores the same. A controller 6 selects a quantization parameter for the quantizing unit 3 and coefficients to be coded in the variable length coding unit 4 so that the buffer memory 5 does not overflow.

The conventional coding apparatus in the aforementioned structure will operate in the following manner. The inputted digital image signal is composed of, e.g., a luminance signal and two color difference signals which are subjected to time-division multiplex and then divided into blocks, for example, consisted of 8 picture elements $\times$ 8 lines in the formatting circuit 1 and outputted to the DCT circuit 2. In the DCT circuit 2, supposing that the inputted image signal in each block is expressed by $x(i,j)$ ($i, j = 0, 1, \ldots, 7$), DCT on 8 picture elements in horizontal direction is performed to the image signal based on the equations as below;

$$f(0,j) = \frac{1}{2\sqrt{2}} \sum_{i=0}^{7} x(i,j)$$

$$f(m,j) = \frac{1}{2} \sum_{i=0}^{7} x(i,j) \cos \frac{(2i+1)m\pi}{16}$$

$$(m = 1, 2, \ldots, 7) (j = 0, 1, \ldots, 7)$$

Thereafter, DCT on 8 picture elements in vertical direction is conducted to the transformed image signal $f(0,j)$ and $f(m,j)$ as indicated below, whereby the image signal is expressed by coefficients $F(m,n)$ ($m, n = 0, 1, \ldots, 7$) and outputted to the quantizing unit 3;

$$F(m,0) = \frac{1}{2\sqrt{2}} \sum_{j=0}^{7} f(m,j)$$

$$F(m,n) = \frac{1}{2} \sum_{j=0}^{7} f(m,j) \cos \frac{(2j+1)n\pi}{16}$$

$$(n = 1, 2, \ldots, 7) (m = 0, 1, \ldots, 7)$$

The obtained coefficients are quantized in the quantizing unit 3 in accordance with the quantization step selected on the basis of the content thereof and quantizing parameter from the controller 6. In the case where the content of the coefficients represents an image of a leading edge part with strong contrast, a coarse quantization step is selected. On the other hand, if the content of the coefficients show an image of a detailed part with small amplitude, a fine quantization step is selected.

The quantized coefficients are stored in the buffer memory 5 after they are subjected to variable length coding in the variable length coding unit 4. The amount of data stored in the buffer memory 5 is so checked by the controller 6 as not to overflow. The controller 6 determines the quantization parameter in compliance with the amount of data stored in the buffer memory 5 and outputs the same to the quantizing unit 3. Moreover, the controller 6 selects coefficients to be coded by the variable length coding unit 4 in accordance with the amount of data, and outputs the coefficients to the variable length coding unit 4. The data stored in the buffer memory 5 is read at a fixed rate.

FIG. 2 is a block diagram showing the structure of another conventional coding apparatus disclosed, for example, in the prior art referred to earlier. The parts designated by the same reference numerals in FIG. 2 are similar to those in FIG. 1 and therefore detailed description thereof will be abbreviated here. A weighting unit 7 of this apparatus makes a difference, which is intervened between the formatting circuit 1 and quantizing unit 3 so as to perform weighting on the coefficients outputted from the DCT circuit 2. The quantizing unit 3 quantizes each coefficient subjected to weighting by the weighting unit 7.

The operation of the coding apparatus of FIG. 2 will be discussed below. Similar to the example shown in FIG. 1, the image signal is divided into blocks by the formatting circuit 1 and then, the image signal in each block is processed by DCT on 8 picture elements in horizontal and vertical directions in the DCT circuit 2. The resultant coefficients $F(m,n)$ are generated to the weighting unit 7. Each coefficient from the DCT circuit 2 is subjected to weighting in the weighting unit 7. More specifically, supposing that the result of DCT operation for each block of 8 picture elements $\times$ 8 lines is divided into four areas as indicated in FIG. 3, as utilizing the fact that the human eyesight is weak to high spatial frequencies, such a weighting factor $W(m,n)$ is used so that weighting with low rate is conducted for an area F4 including high spatial frequency components, whereas weighting with high rate is performed for an area F1 including low spatial frequency components (refer to FIG. 4).

$$W(m,n) = \frac{7 - (1-a)m}{7} \times \frac{7 - (1-a)n}{7}$$

-continued $(0 < a \leq 1), (m,n = 0, 1, \ldots, 7)$

The coefficients after being subjected to weighting are outputted to the quantizing unit 3. Since the subsequent operation in the quantizing unit 3, buffer memory 5 and controller 6 is carried out in the same manner as in the coding apparatus of FIG. 1, description thereof will be abbreviated.

Although the conventional coding apparatuses are constructed as described hereinabove, they still have problems remaining to be solved as to the selection of the quantization step and constitution of the weighting unit.

For example, the quantization step is selected in the quantizing unit 3 in accordance with an alternating current power E obtained from the coefficients F(m,n) by an equation;

$$E = \sum_{m=0}^{7} \sum_{n=0}^{7} F(m,n)^2 - F(0,0)^2$$

A fine quantization is performed when the alternating current power E is small, while quantization is done in a coarse manner if the power E is large. In other words, a detailed part of an image having a small change in amplitude is quantized finely. On the other hand, and edge part with strong contrast is quantized in a coarse manner. If an image includes lines with high contrast in a flat part of a flat background where the image signal changes little, the block of the image is quantized coarsely. However, quantization errors spread all over the block subsequent to an inverse DCT at a decoder side, thereby causing overlapping of noises even in the flat part. Since the noises in the flat part appear considerably annoying, the image quality cannot be free from undesirable degradation.

Moreover, $8^2$, 64 read only memories (ROM's) are necessitated to perform weighting on the coefficients of each block size $8 \times 8$, thus making the weighting unit bulky in size.

SUMMARY OF THE INVENTION

A object of this invention is to provide a coding apparatus designed to quantize an image signal in such a manner that even a flat part of the image keeps favorable image quality at a decoder side.

A further object of this invention is to provide a coding apparatus permitting a flat part of the image in each block whose degradation of image quality is conspicuous to keep favorable image quality at a decoder side.

A still further object of this invention is to provide a coding apparatus enabling reduction of an image signal, with using a small number of adders, in a manner not to result in a striking degradation of image quality.

A coding apparatus according to this invention is provided with block formatting means for dividing a digital image signal into blocks of plurality of picture elements, orthogonal transforming means for performing orthogonal transform on the formatted image signal, quantizing means for quantizing coefficients obtained through the orthogonal transform with a quantization table, means for dividing each block of the image signal outputted from the block formatting means into a plurality of sub-blocks and obtaining criterion values from the absolute value sum of difference of image signal level between adjacent picture elements in each sub-block, and deciding means for deciding the quantization table on the basis of the criterion values.

In a further aspect of this invention, a coding apparatus is provided with block formatting means for dividing a digital image signal into blocks of every plurality of picture elements, orthogonal transforming means for performing orthogonal transform on the formatted image signal, weighting means for performing weighting on coefficients obtained through the orthogonal transform with a weighting factor, means for dividing each block of the image signal outputted from the block formatting means into a plurality of sub-blocks and obtaining criterion values from the absolute value sum of difference of image signal level between adjacent picture elements in each sub-block, and deciding means for deciding the weighting factor on the basis of the criterion values.

For the combination of the criterion values, the minimum value among the absolute value sum and the difference between the maximum and minimum values among the absolute value sum, or, the minimum and maximum values among the absolute value sum are employed.

In a still further aspect of this invention, a coding apparatus is provided with block formatting means for dividing a digital image signal into blocks of plurality of picture elements, orthogonal transforming means for performing orthogonal transform on the formatted image signal, quantizing means for quantizing coefficients obtained through the orthogonal transform with a quantization table, means for dividing each block of the image signal outputted from the block formatting means into a plurality of sub blocks and obtaining the maximum and minimum values of the image signal level of picture elements in each sub-block, and deciding means for deciding the quantization table on the basis of the maximum and minimum values.

In a yet further aspect of this invention, a coding apparatus is provided with block formatting means for dividing a digital image signal into blocks of plurality of picture elements, orthogonal transforming means for performing orthogonal transform on the formatted image signal, weighting means for performing weighting on coefficients obtained through the orthogonal transform, means for dividing each block of the image signal outputted from the block formatting means into a plurality of sub-blocks and obtaining the maximum and minimum values of the image signal level of picture elements in each sub-block, and deciding means for deciding a weighting factor for the weighting means on the basis of the maximum and minimum values.

In addition to the aforementioned means, the coding apparatus in any aspect of this invention further includes means for performing variable length coding on the quantized (or subjected-to-weighting) coefficients, memory means for storing the variable-length-coded coefficients, and a controlling means for detecting the storing amount of the memory means thereby to control the quantizing means (or deciding means) to decide the quantization table (or weighting factor) so that the storing amount is kept within a fixed range of volume. It is to be noted here that the block divided by the block formatting means may be either a two-dimensional block in horizontal and vertical directions or a three-dimensional block in horizontal, vertical and time directions. Moreover, DCT (Discrete Cosine Transform) is used for the orthogonal transform.

In the coding apparatus of this invention, the digital image signal is formatted in blocks and further divided into sub-blocks. Criterion values are calculated corresponding to the image signal in each sub-block, and the image state is determined on the basis of the criterion values, whereby the appropriate quantization table (or weighting factor) can be decided. It is detected for every block whether a flat part the degradation of image quality of which is noticeable is present or the image is one that is liable to generate quantization errors at the decoder side. Therefore, the image with less degradation of image quality is quantized (or subjected to weighting) with low rate, that is, with large reduction rate, while the image with much degradation of image quality is quantized (or subjected to weighting) with high rate, namely, with small reduction rate. Accordingly, the coding apparatus can output the image signal without conspicuous noises even for the flat part.

The coding apparatus according to a yet further aspect of this invention is provided with block formatting means for dividing a digital image signal into blocks of plurality of picture elements, orthogonal transforming means for performing orthogonal transform on each formatted block, weighting means having multipliers of a smaller number than the number of picture elements in each block for performing weighting on the coefficients obtained through the orthogonal transform and, means for performing variable length coding on the coefficients subjected to weighting. The weighting means in this coding apparatus performs weighting on the coefficients with using a weighting factor suitable for a sequency degree in horizontal direction in each block and a sequency degree in vertical direction in each block. Accordingly, weighting becomes possible by not more than $N^2/4$ multipliers, for example, in each block of the size $N \times N$. Thus, coding with high efficiency having no conspicuous degradation of image quality can be achieved with a little number of multipliers.

The above and further objects and features of the invention will more fully be apparent from the following detailed description with accompanying drawings.

BRIEF DESCRIPTION OF THE DRAWINGS

FIG. 32 shows a bit map equipped in a variable length coding unit in the coding apparatus of the seventh embodiment;

DESCRIPTION OF THE PREFERRED EMBODIMENTS

This invention will become apparent from the following description taken in conjunction with preferred embodiments thereof with reference to the accompanying drawings.

Figure 1:
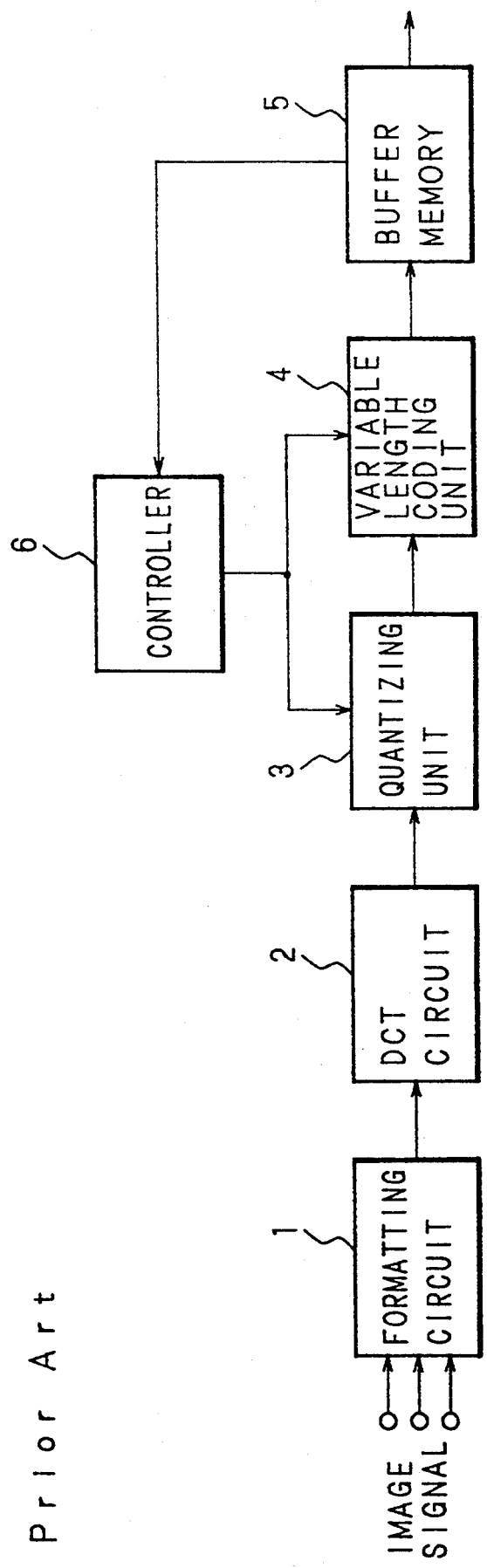
FIG. 1 shows a block diagram of the structure of a conventional coding apparatus.
Figure 2:
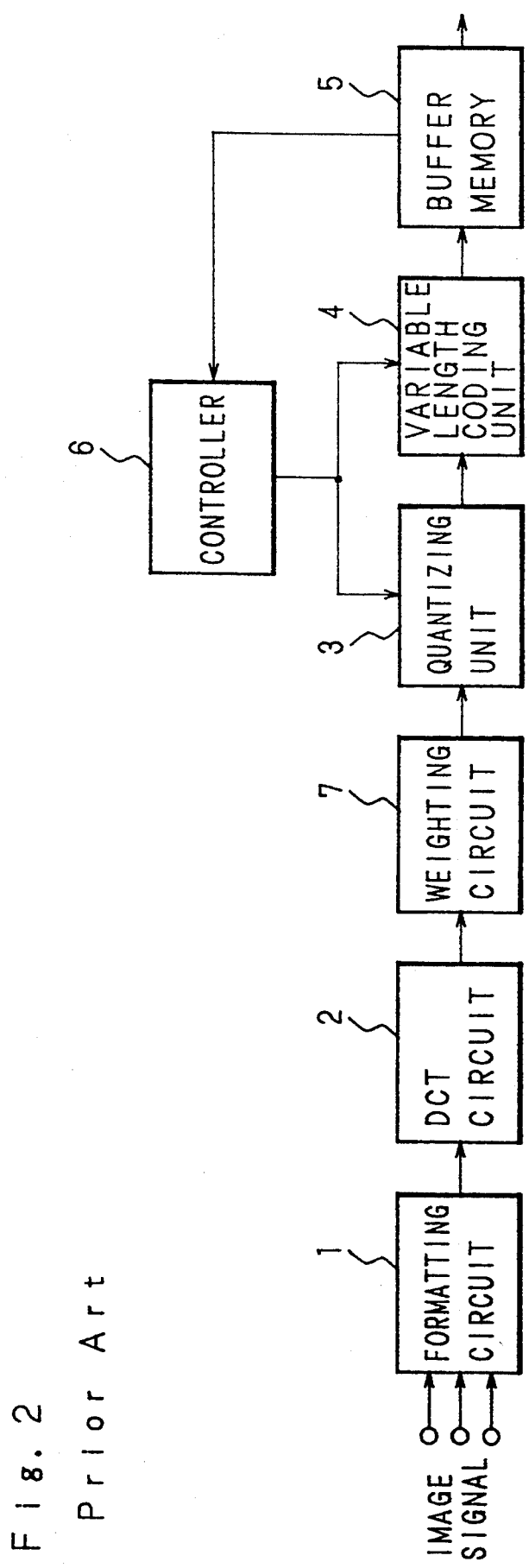
FIG. 2 shows a block diagram of the structure of another conventional coding apparatus.
Figure 3:
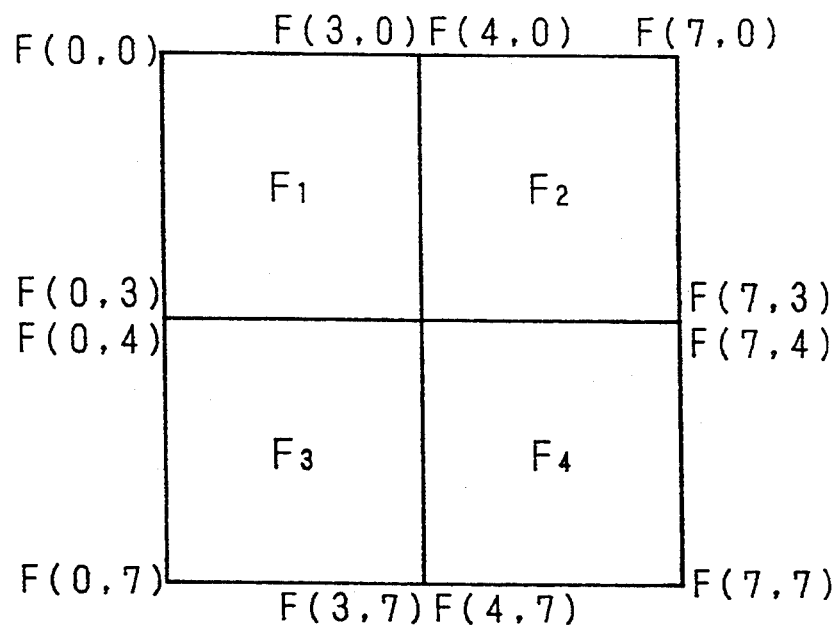
FIG. 3 shows a conceptional diagram explanatory of the operation of a weighting unit of the conventional apparatus of FIG. 2.
Figure 4:
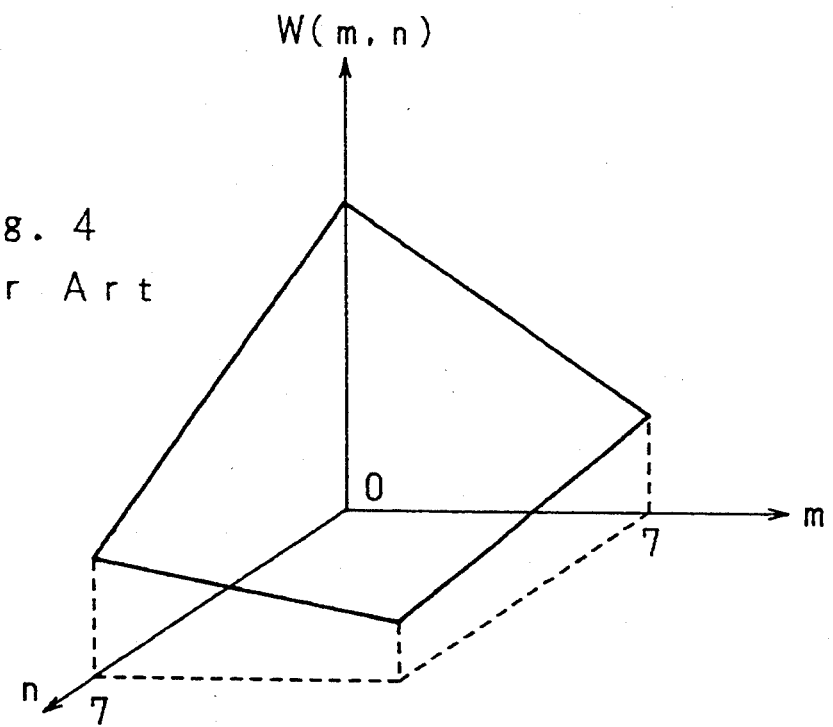
FIG. 4 shows a conceptional view exemplifying how to perform weighting in the conventional apparatus of FIG. 2.
Figure 5:
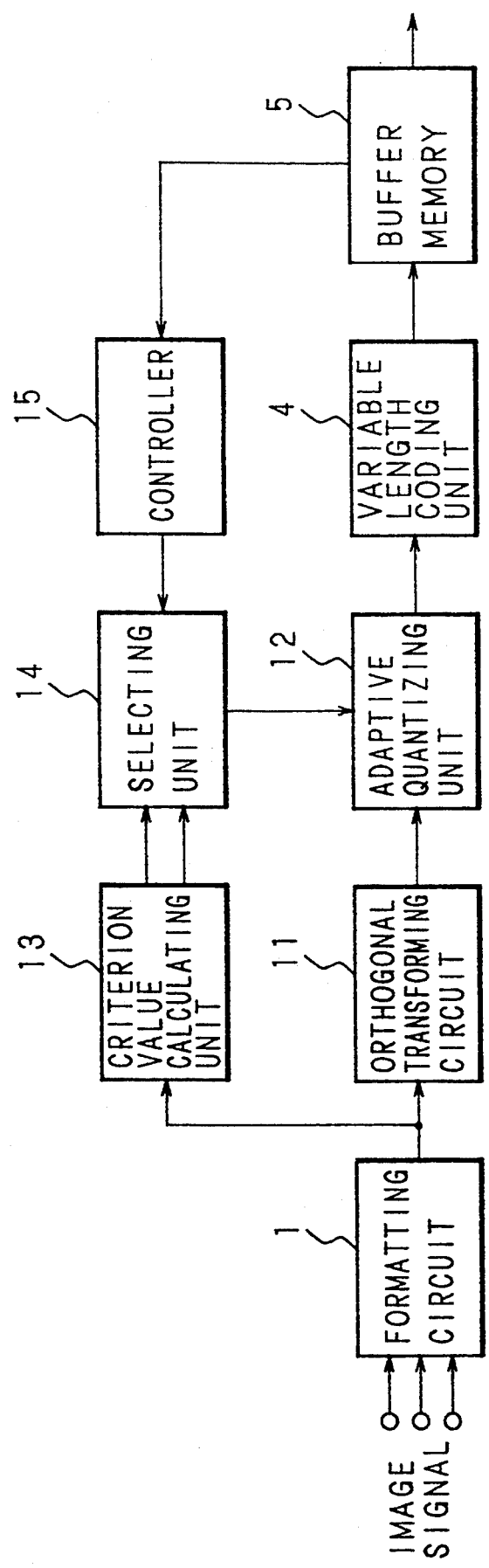
FIG. 5 shows a block diagram of the structure of a coding apparatus according to a first embodiment of this invention.

Referring first to FIG. 5, there illustrated is a block diagram showing the structure of a coding apparatus according to a first embodiment of this invention, wherein numerals 1, 4 and 5 respectively represent a formatting circuit for dividing an inputted digital image into a plurality of blocks, a variable length coding unit for performing variable length coding on an output from an adaptive quantizing unit 12 and a buffer memory for storing an output from the variable length coding unit 4. These components are equivalent to those disclosed in the conventional apparatuses shown in FIGS. 1 and 2. In addition to these components, the coding apparatus according to the first embodiment includes an orthogonal transforming circuit 11 which performs orthogonal transform on each block of the image signal from the formatting circuit 1, the adaptive quantizing unit 12 which has a plurality of quantization tables making adaptive quantization to coefficients from the circuit 11, a criterion value calculating unit 13 which divides each block divided by the formatting circuit 1 further into a plurality of sub-blocks, and calculates and outputs a first and a second criterion values as a selecting criterion of the quantization table, a selecting unit 14 for selecting a quantization table based on an output from the calculating unit 13 and outputting the content of the quantization step to the adaptive quantizing unit 12, and a controller 15 which controls the selecting unit 14 so that the buffer memory 5 does not overflows. The quantiaztion table may be uniform quantizer with fixed step width, or it may be nonlinear quantizer with irregular step width.

Figure 6:
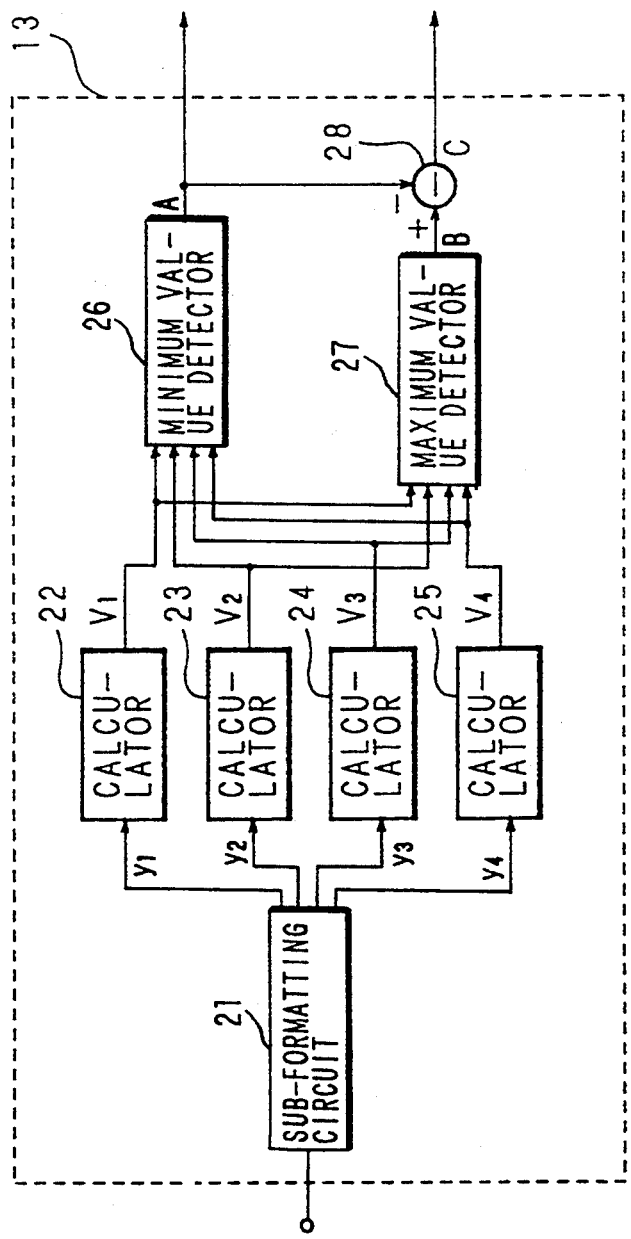
FIG. 6 shows a block diagram of the structure of an example of a criterion value calculating unit in the coding apparatus according to the first and a fourth embodiments of this invention.

As shown in FIG. 6, the criterion value calculating unit 13 is provided with a sub-formatting circuit 21 which divides each block of the image signal from the circuit 1 into, for example, four sub-blocks, four calculators 22, 23, 24 and 25 each for obtaining the absolute value sum of difference of image signal level between adjacent picture elements in horizontal and vertical directions in each subblock, a minimum value detector 26 for detecting the minimum value A of the outputs from the four calculators 22–25, a maximum value detector 27 for detecting the maximum value B of the outputs from the four calculators 22–25, and a subtracter 28 which subtracts the minimum output A from the maximum output B. The criterion value calculating unit 13 outputs the output A from the minimum value detector 26 as the first criterion value, and an output $C(=B-A)$ from the subtracter 28 as the second criterion value, to the selecting unit 14.

Now, the operation of the coding apparatus will be explained hereinbelow. When a digital image signal (composed of a luminance signal and two color difference signals or RGB signals) is inputted to the formatting circuit 1, it is subjected to time-division multiplex, and, divided into blocks, e.g., each consisting of 8 picture elements×8 lines. Each block is outputted to the orthogonal transforming circuit 11 and criterion value calculating unit 13. In the circuit 11, an orthogonal transform such as Discrete Cosine Transform (DCT) or the like is performed on the image signal. Coefficients which are outputs from the circuit 11 are generated to the adaptive quantizing unit 12.

Figure 7:
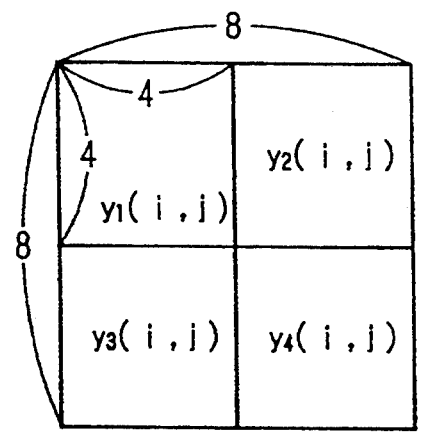
FIG. 7 shows a diagram explanatory of the operation of a sub-formatting circuit in the criterion value calculating unit.

In the criterion value calculating unit 13, as illustrated in FIG. 7, each block consisting of 8 picture elements ×8 lines which is outputted from the formatting circuit 1 is divided into four sub-blocks y1, y2, y3 and y4 each consisting of 4 picture elements×4 lines. In this case, an image signal in each sub-block y1, y2, y3 or y4 is expressed by y1(i,j), y2(i,j), y3(i,j) or y4(i,j,) (i,j=1, 2, 8, 4). The image signal in each sub-block y1, y2, y8 or y4 is inputted to the respective calculator 22, 28, 24 or 25. The calculator 22 calculates the absolute value sum V1 of difference of image signal level between adjacent picture elements in horizontal and vertical directions in the subblock y1 based on an equation as follows;

$$V1 = \sum_{j=1}^{4} \sum_{i=1}^{3} |y_1(i,j) - y_1(i+1,j)| + \sum_{i=1}^{4} \sum_{j=1}^{3} |y_1(i,j) - y_1(i,j+1)|$$

Moreover, the other calculators 23, 24 and 25 calculate in the same manner the absolute value sums V2, V3 and V4 of difference of image signal level between adjacent picture elements in horizontal and vertical directions in the sub-blocks y2, y3 and y4, respectively as follows;

$$V2 = \sum_{j=1}^{4} \sum_{i=1}^{3} |y_2(i,j) - y_2(i+1,j)| + \sum_{i=1}^{4} \sum_{j=1}^{3} |y_2(i,j) - y_2(i,j+1)|$$

$$V3 = \sum_{j=1}^{4} \sum_{i=1}^{3} |y_3(i,j) - y_3(i+1,j)| + \sum_{i=1}^{4} \sum_{j=1}^{3} |y_3(i,j) - y_3(i,j+1)|$$

$$V4 = \sum_{j=1}^{4} \sum_{i=1}^{3} |y_4(i,j) - y_4(i+1,j)| + \sum_{i=1}^{4} \sum_{j=1}^{3} |y_4(i,j) - y_4(i,j+1)|$$

The minimum value detector 26 detects the minimum value A=MIN {V1,V2,V3,V4} of the four outputs V1, V2, V3 and V4 generated from the calculators 22, 23, 24 and 25, and outputs the value A to the selecting unit 14 as the first criterion value to select the quantization step and also to the subtracter 28. In the meantime, the maximum value detector 27 detects the maximum value B=MAX {V1,V2,V3,V4} of the four outputs from the calculators 22, 23, 24 and 25, and outputs the value B to the subtracter 28. In consequence, the subtracter 28 calculates the difference C between B and A, outputting the value C to the selecting unit 14 as the second criterion value to select the quantization step.

The first criterion value A is to detect a flat part in the image. If the first criterion value A is small, it means that the block includes a flat part whose degradation of image quality is ready to notice at a decoder side. On the other hand, the second criterion value C is to detect a change in the image. Therefore, the larger the second criterion value C, the more the image changes in the block, and a quantization error is easily brought about at the decoder side.

The selecting unit 14 selects the quantization step to quantize the coefficients in the adaptive quantizing unit 12 in accordance with the first and second criterion values A and C. The adaptive quantizing unit 12 holds quantization tables of different quantization steps, for example, a quantization table with high rate, a quantization table with medium rate and a quantization table with low rate. The quantization table with high rate is used to quantize the coefficients finely. The quantization table with medium rate is a table where the quantization step is performed with medium rate, while the quantization table with low rate is to quantize the coefficients coarsely. The selecting unit 14 selects the optimum quantization table among the three tables in accordance with the first and second criterion values A and C on the basis of a selecting diagram indicated in FIG. 8 or 9. In the case where the first criterion value A is small, since the block has a flat part easy to degrade the image quality, the quantization table with high rate or the quantization table with medium rate is selected. In the case where the second criterion value C is large, since the image in the block greatly changes which leads to a quantization error at the decoder side, the quantization table with high rate is selected to quantize in a fine manner.

Figure 10A:
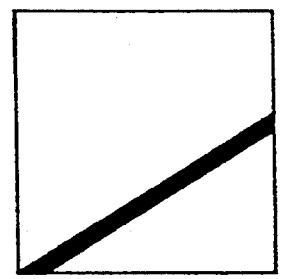
FIGS. 10A-10C shows an example of an image block.
Figure 10B:
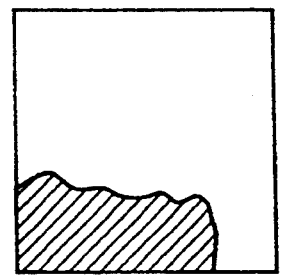
Figure 10C:
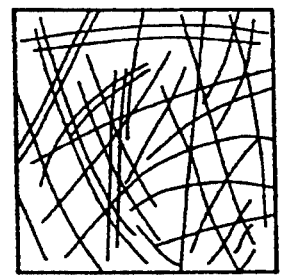
Figure 11:
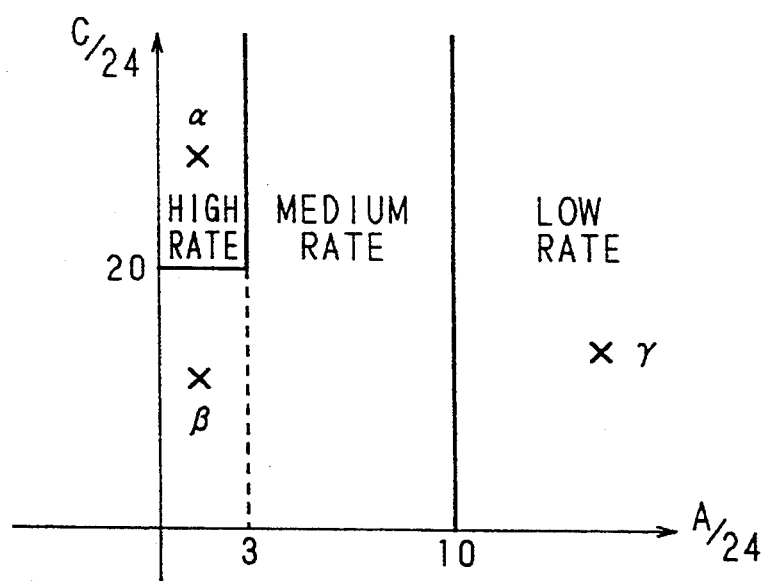
FIG. 11 shows a diagram of an example of selection in each image block of FIG. 10 according to the first and fourth embodiments.

By way of example, an image block shown in FIG. 10 is used to explain the operation of the selecting unit 14 on the basis of a selecting diagram of FIG. 11. For simplification of the explanation, the average variation quantity $Mn=Vn/24$ is employed here in place of the absolute value sum $Vn$ ($n=1, 2, 3, 4$) of difference of image signal level between adjacent picture elements in the sub-block.

FIG. 10($a$) illustrates a block where a line is drawn slantwise with strong contrast to the flat background. Since the quantization noises spread in the flat part in the block and the degradation of the image quality is conspicuous at the decoder side, the quantization table with high rate should be employed. The average variation quantity in each sub-block of the block is for example $M1=2$, $M2=2$, $M3=10$ and $M4=33$. In this case, the criterion values $A/24$ and $C/24$ are respectively:

$A/24=MIN\{M1,M2,M3,M4\}=2$ and $C/24=MAX\{M1,M2,M3,M4\}$
$-MIN\{M1,M2,M3,M4\}=31.$ Therefore, the case is corresponding to a point $\alpha$ in the diagram of FIG. 11, so that the selecting unlit 14 selects the quantization table with high rate.

FIG. 10($b$) illustrates a block with an edge having not so high contrast to the flat background. Although the quantization table with low rate cannot be employed for this block because of the presence of the flat part, the contrast is not so strong and the quantization error at the decoder side results small, and accordingly the quantization table with medium rate may be used. The average variation quantity in each sub-block of the block is for example $M1=2$, $M2=3$, $M3=14$ and $M4=15$. In this case, the criterion values with a point $\beta$ in the diagram of FIG. 11. In consequence, the selecting unit 14 selects the quantization table with medium rate.

In the meantime, FIG. 10($c$) illustrates a block having a great change in contrast all thereover. The quantization error is hard to be recognized at the decoder side, and therefore the quantization table with low rate can be used thereby to raise the reduction rate. The average variation quantity in each sub-block of the block is for example $M1=28$, $M2=30$, $M3=24$ and $M4=16$. The criterion values $A/24$ and $C/24$ are 16 and 14, respectively, which is coincident with a point $\gamma$ in the diagram of FIG. 11. As a result, the quantization table with low rate is selected by the selecting unit 14.

Figure 8:
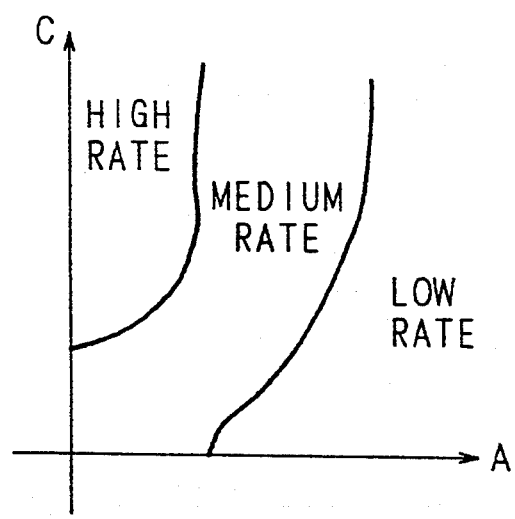
FIG. 8 and 9 show diagrams explanatory of the operation of a selecting unit in the coding apparatus according to the first and fourth embodiments.
Figure 9:
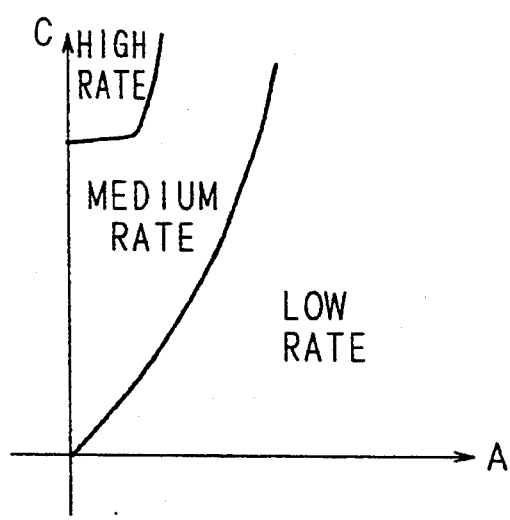

In connection with the above, the criterion for selecting the quantization step, namely, the occupation rate of each quantization table is different in FIGS. 8 and 9. The controller 15 determines which of FIGS. 8 and 9 is to be used as the selecting diagram. The controller 15 works, by detecting the amount of data stored in the buffer memory 5, to adjust the rate with which the coefficients are quantized in the adaptive quantizing unit 12 so that the buffer memory 5 does not overflow. In other words, if the buffer memory can afford a sufficient amount of data, the controller 15 adjusts the deciding unit 14 to select the criterion shown in FIG. 8 so that the quantization table with high rate is selected more often. On the other hand, if the buffer memory 5 cones to be nearly saturated, the controller 15 adjusts the selecting unit 14 to select the criterion shown in FIG. 9, whereby the quantization table with low rate is more frequently selected. In the manner as above, the rate when the coefficients are outputted to the buffer memory 5 is adjusted by the controller 15.

The adaptive quantizing unit 12 selects the adequate quantization step for each block in accordance with the selecting result of the selecting unit 14, and quantizes the coefficients outputted from the orthogonal transforming circuit 11. Thereafter, the unit 12 outputs both the selected quantization step and quantized coefficient to the variable length coding unit 4. The coefficients are, after being subjected to variable length coding and stored in the buffer memory 5, read out at a fixed rate for transmission.

According to the foregoing embodiment, the first and second criterion values A and C are obtained from the difference of image signal level between adjacent picture elements in horizontal and vertical directions. However, particularly in the case where the signal is to be processed in one field during the interlaced scanning, since the adjacent picture elements in vertical direction are separated a distance, the first criterion value for detecting the flat part may be obtained from the difference of image signal level between adjacent picture elements only in horizontal direction.

Figure 12:
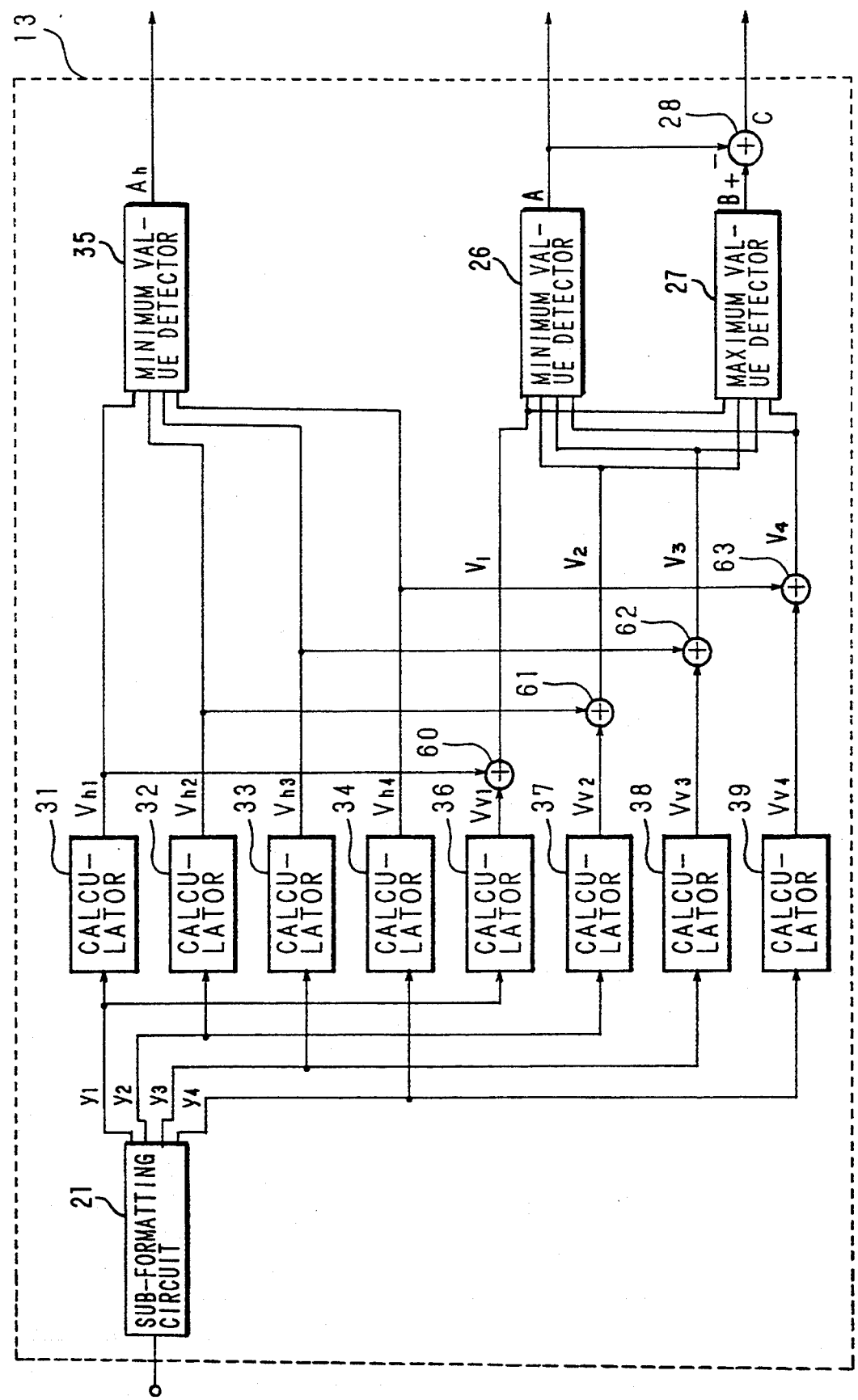
FIG. 12 shows a block diagram of the structure of another example of the criterion value calculating unit according to the first and fourth embodiments.

Such modified example as referred to above is shown in FIG. 12. The modified criterion value calculating unit 13 of FIG. 12 is provided with the sub-formatting circuit 21, calculators 31, 32, 33 and 34 for obtaining the absolute value sum of the difference of image signal level between adjacent picture elements in horizontal direction in respective sub-blocks, a minimum value detector 35 for detecting the minimum value among the outputs of the calculators 31, 32, 33 and 34, calculators 36, 37, 38 and 39 for obtaining the absolute value sum of the difference of image signal level between picture elements in vertical;direction in respective sub-blocks, an adder 60 for adding the outputs of the calculators 31 and 36, an adder 61 adding the outputs of the calculators 32 and 37, an adder 62 for adding the outputs of the calculators 33 and 38, an adder 63 for adding the outputs of the calculators 34 and 39, the minimum value detector 26 for detecting the minimum value among the outputs of the adders 60, 61, 62 and 63, the maximum value detector 27 for detecting the maximum value of the outputs of the adders 60, 61, 62 and 63, and the subtracter 28 for subtracting the output of the minimum value detector 26 from the output of the maximum value detector 27.

Hereinbelow, the operation of the criterion value calculating unit 13 will be explained. Image signals in the sub-blocks y1, y2, y3 and y4 which are outputted from the sub formatting circuit 21 are expressed by y1(i,j), y2(i,j), y3(i,j) and y4(i,j) (i,j=1, 2, 3, 4) respectively. The signals in the sub-blocks y1, y2, y3 and y4 are inputted to the calculators 31, 32, 33 and 34, respectively. The calculator 31 calculates the absolute value sum Vh1 of the difference of image signal level between adjacent picture elements in horizontal direction in the sub-block y1 as follows;

$$Vh1 = \sum_{j=1}^{4} \sum_{i=1}^{3} |y_1(i,j) - y_1(i+1,j)|$$

The other calculators 32, 33 and 34 also calculate the absolute value sums Vh2, Vh3 and Vh4 of the difference of image signal level between adjacent picture elements in horizontal direction within the respective sub-blocks y2, y3, and y4 as follows;

$$Vh2 = \sum_{j=1}^{4} \sum_{i=1}^{3} |y_2(i,j) - y_2(i+1,j)|$$

$$Vh3 = \sum_{j=1}^{4} \sum_{i=1}^{3} |y_3(i,j) - y_3(i+1,j)|$$

$$Vh4 = \sum_{j=1}^{4} \sum_{i=1}^{3} |y_4(i,j) - y_4(i+1,j)|$$

The minimum value detector 35 detects the minimum value Ah=MIN {Vh1,Vh2,Vh3,Vh4} of the outputs Vh1, Vh2, Vh3 and Vh4 of the calculators 31, 32, 33 and 34. The minimum value Ah is outputted to the selecting unit 14 as a first criterion value for selecting the quantization step in the adaptive quantizing unit 12.

Meanwhile, the image signals in the sub-blocks y1, y2, y3 and y4 are outputted also to the calculators 36, 37, 38 and 39, respectively. The calculator 36 calculates the absolute value sum Vv1 of the difference of image signal level between adjacent picture elements in vertical direction in the sub-block y1 on the basis of the following equation;

$$Vv1 = \sum_{i=1}^{4} \sum_{j=1}^{3} |y_1(i,j) - y_1(i,j+1)|$$

Likewise, the other calculators 37, 38 and 39 calculate the absolute value sums Vv2, Vv3 and Vv4 of the difference of image signal level between adjacent picture elements in vertical direction in the sub-blocks y2, y3 and y4, respectively, as follows;

$$Vv2 = \sum_{i=1}^{4} \sum_{j=1}^{3} |y_2(i,j) - y_2(i,j+1)|$$

-continued $$Vv3 = \sum_{i=1}^{4} \sum_{j=1}^{3} |y_3(i,j) - y_3(i,j+1)|$$

$$Vv4 = \sum_{i=1}^{4} \sum_{j=1}^{3} |y_4(i,j) - y_4(i,j+1)|$$

The outputs Vh1 and Vv1 of the calculators 31 and 36 are inputted to the adder 60, and V1=Vh1+Vv1 is calculated. In the similar manner, V2(=Vh2+Vv2), V3(=Vh3+Vv3) and V4(=Vh4+Vv4) are calculated in the adders 61, 62 and 63, respectively. The minimum value detector 26 detects the minimum value A=MIN {V1,V2,V3,V4} of the outputs V1, V2, V3 and V4 from the adders 60, 61, 62 and 63 to output the same to the subtracter 28. At the same time, the maximum value detector 27 detects the maximum value B=MAX {V1,V2,V3,V4} of the outputs V1, V2, V3 and V4 from the adders 60, 61, 62 and 63 to generate the same to the subtracter 28. The subtracter 8 calculates and outputs the difference C between the maximum value B and the minimum value A. The obtained value C is sent to the selecting unit 14 as a second criterion value to select the quantization step.

Since the subsequent procedure goes the same way as in the foregoing embodiment, it will be omitted from the description.

Now, a coding apparatus according to a second embodiment will be discussed below.

According to the second embodiment, the maximum value B is used as the second criterion value although the subtracting value C obtained by subtracting the minimum value A from the maximum value B is employed as the second criterion value in the foregoing first embodiment. It is to be noted here, however, that the minimum value A is set as the first criterion value also in the second embodiment, similar to the first embodiment.

Figure 13:
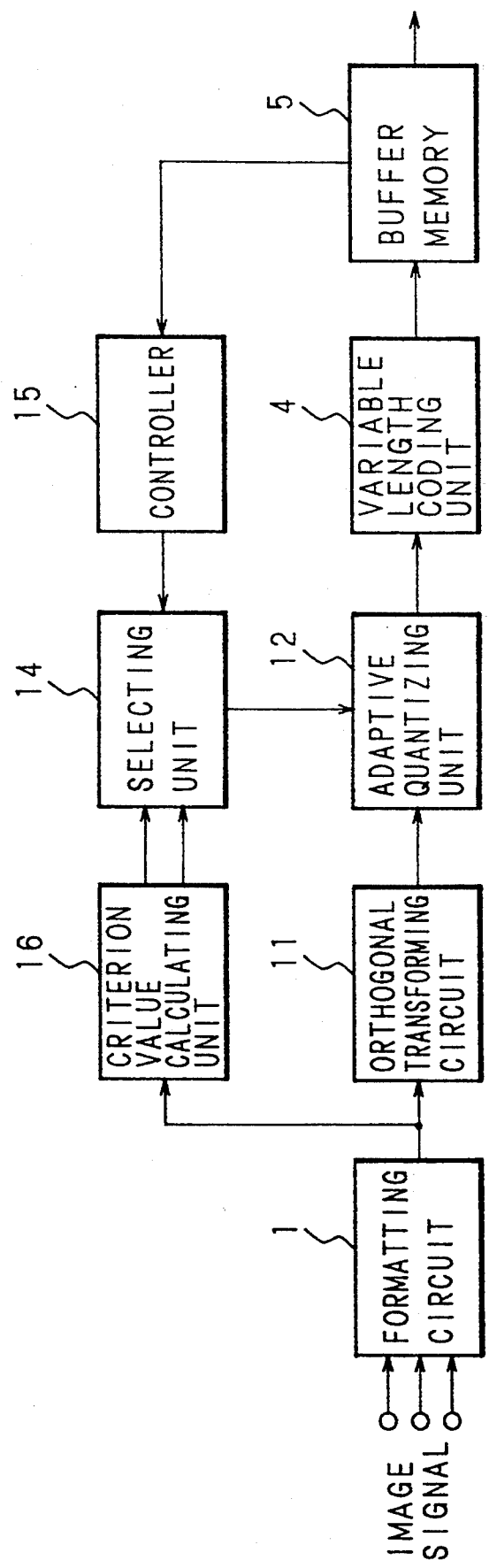
FIG. 13 shows a block diagram of the structure of a coding apparatus according to a second embodiment of this invention.
Figure 14:
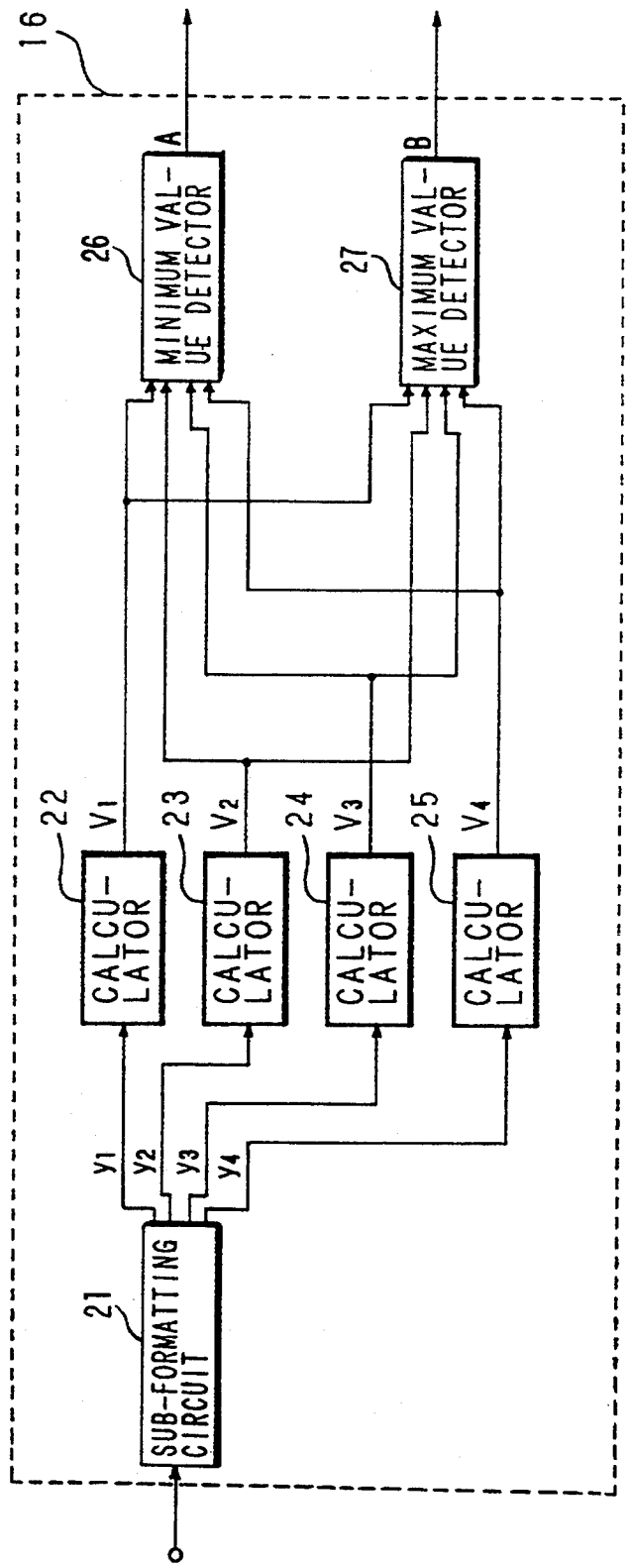
FIG. 14 shows a block diagram of the structure of an example of a criterion value calculating unit in the coding apparatus according to the second and a fifth embodiments of this invention.

Referring to FIG. 13 showing the structure of the coding apparatus of the second embodiment, numerals 1, 4, 5, 11, 12, 14 and 15 respectively represent the formatting circuit, variable length coding unit, buffer memory, orthogonal transforming circuit, adaptive quantizing unit, selecting unit and controller, all of which are equivalent to those components shown in FIG. 5 and therefore the detailed description thereof will be abbreviated. FIG. 14 shows the structure of a criterion value calculating unit 16 in the coding apparatus according to the second embodiment. As compared with the structure of the criterion value calculating unit 13 of the first embodiment shown in FIG. 6, the unit 16 is different in that the subtracter 28 is removed. The criterion value calculating unit 16 detects the minimum value A and maximum value B of the absolute value sums V1, V2, V3 and V4 of the difference of image signal level between adjacent picture elements in horizontal and vertical directions in the sub-blocks y1, y2, y3 and y4, and outputs these values respectively as the first and second criterion values to the selecting unit 14.

Figure 15:
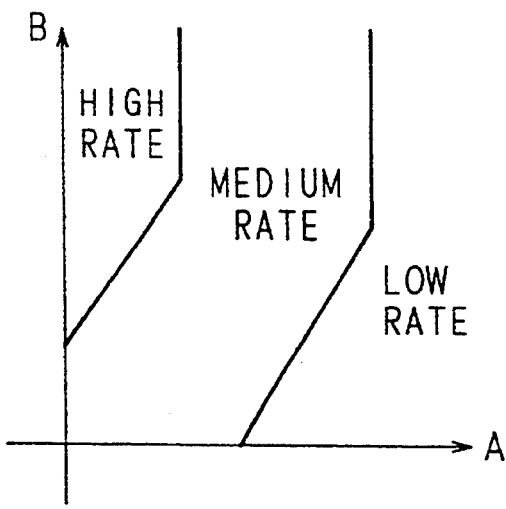
FIGS. 15 and 16 show diagrams explanatory of the operation of a selecting unit in the coding apparatus according to the second and fifth embodiments.
Figure 16:
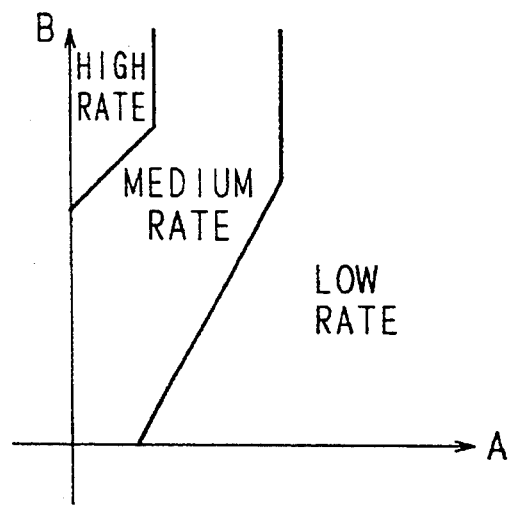
Figure 17:
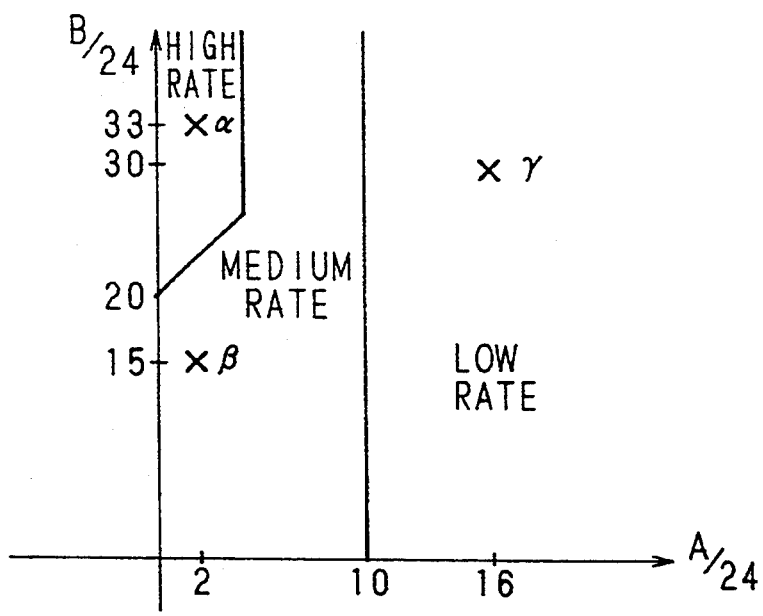
FIG. 17 shows a diagram of an example of selection in each image block of FIG. 10 according to the second and fifth embodiments.

The operation of the coding apparatus of the second embodiment will be described hereinbelow. The selecting unit 14 selects, in compliance with the criterion values A and B and on the basis of a selecting diagram shown in FIG. 15 or 16, the quantization step allowing the adaptive quantizing unit 12 to quantize the coefficients. The operation of the selecting unit 14 will now be depicted in a detailed manner with reference to a selecting diagram of FIG. 17 taken in conjunction with the image block shown in FIG. 10. In the case of FIG. 10(a), the average variation quantity in each sub-block is M1=2, M2=2, M3=10 and M4=33, A/24 being 2 and B/24 being 33, which is coincident with the point α in the diagram of FIG. 17, whereby the selecting unit 14 selects the quantization table with high rate. In the case of FIG. 10(b) where the average variation quantity in each subblock is M1=2, M2=3, M3=14 and M4=15, A/24 and B/24 are respectively 2 and 15, which corresponds to the point β in FIG. 17. Accordingly, the selecting unit 14 selects the quantization table with medium rate. In the case of FIG. 10(c) where the average variation quantity in each sub-block is M1=28, M2=30, M3=24 and M4=16, A/24 and B/24 are 16 and 30, respectively, which is coincident with the point γ in FIG. 17, whereby the selecting unit 14 selects the quantization table with low rate.

Figure 18:
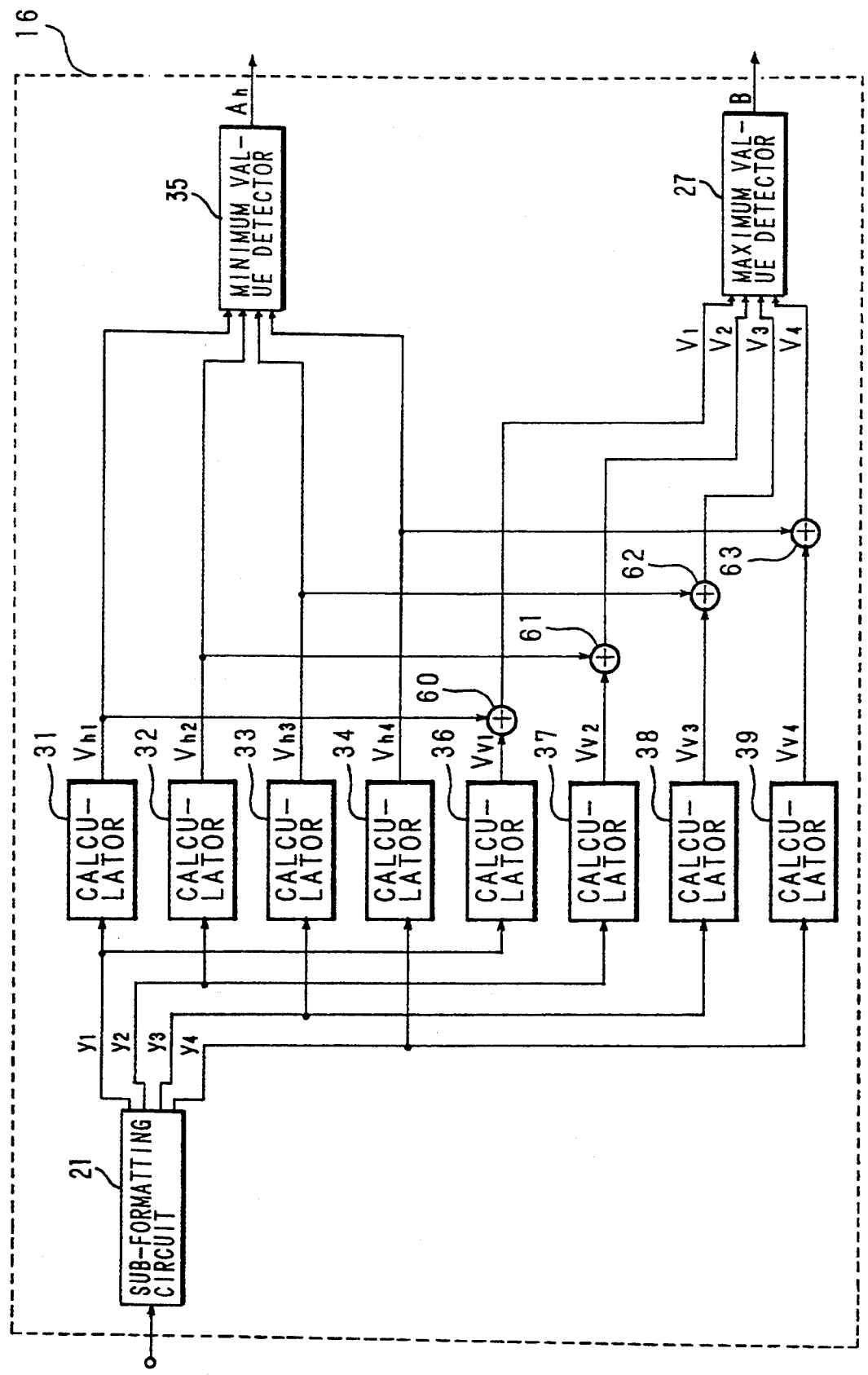
FIG. 18 shows a block diagram of the structure of another example of the criterion value calculating unit according to the second and fifth embodiments.

The other operations of the selecting unit 14 are same as in the first embodiment, and therefore description thereof will be abbreviated. Moreover, similar to the first embodiment, in the event that the signal is processed in one field during the interlaced scanning, since the distance between the adjacent picture elements in vertical direction is large, it may be arranged to obtain the first criterion value from the difference of image signal level between adjacent picture elements only in horizontal direction. A criterion value calculating unit 18 shown in FIG. 18 is a modification of such arrangement as mentioned above. In FIG. 18, the same parts are designated by the same reference numerals as in FIG. 12. The criterion value calculating unit 18 not only outputs the minimum value Ah of the absolute value sum Vhn (n=1, 2, 3, 4) of the difference of image signal level between adjacent picture elements in horizontal direction in each sub-block to the selecting unit 14 as the first criterion value, but outputs the maximum value B of addition value Vn of the absolute value sum Vvn of the difference of image signal level between adjacent picture elements in vertical direction in each sub-block and the absolute value sum Vhn of the difference of image signal level between adjacent picture elements in horizontal direction in each sub-block to the selecting unit 14 as the second criterion value.

A third embodiment of this invention will be described below.

Figure 19:
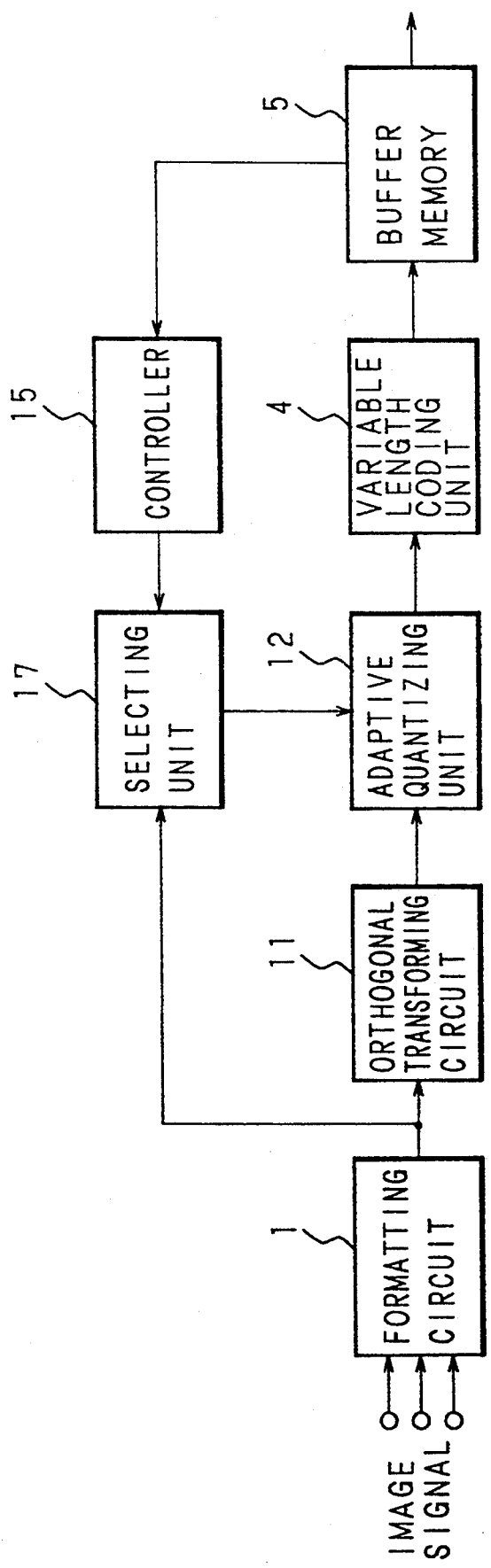
FIG. 19 shows a block diagram of the structure of a coding apparatus according to a third embodiment of this invention.
Figure 20:
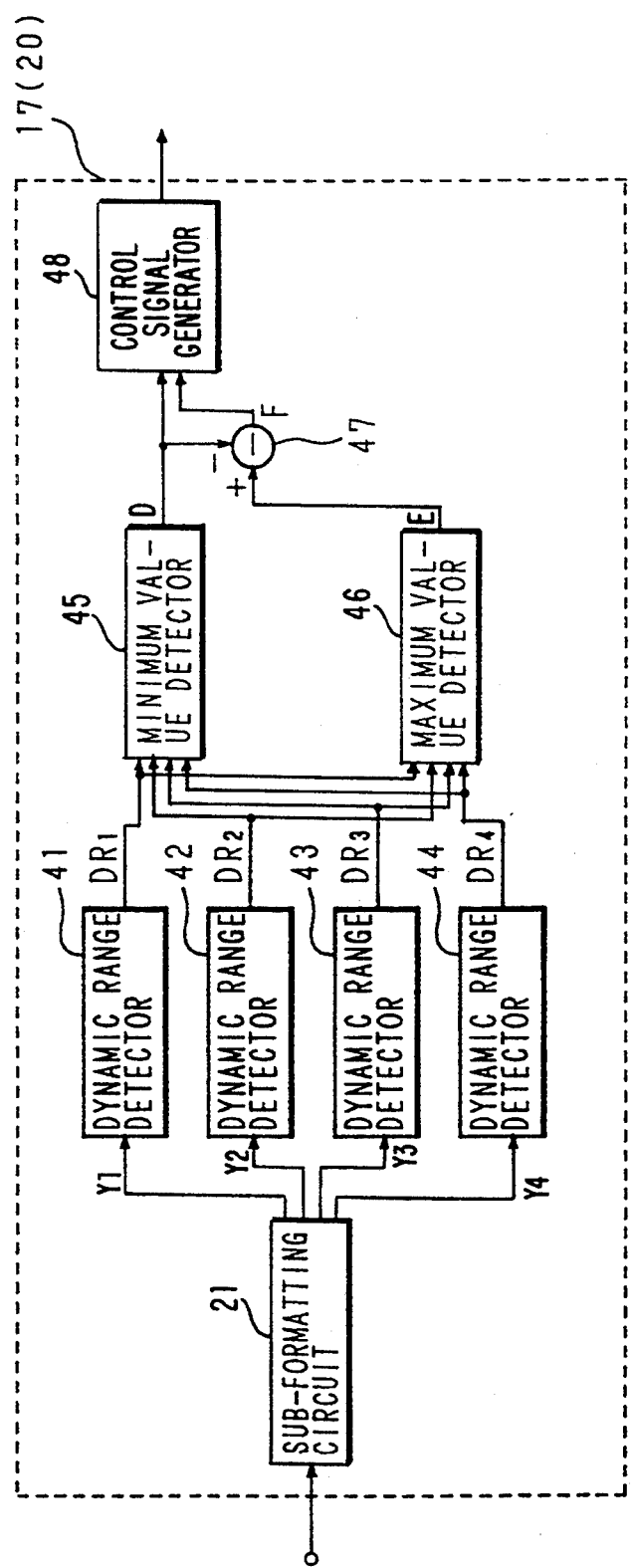
FIG. 20 shows a block diagram of the structure of a selecting unit of the coding apparatus according to the third and a sixth embodiments.

According to the third embodiment, the criterion for selecting the quantization step in the adaptive quantizing unit 12 differs. In FIG. 19 showing the structure of the coding apparatus according to the third embodiment, numerals 1, 4, 5, 11, 12 and 15 represent the formatting circuit, variable length coding unit, buffer memory, orthogonal transforming circuit, adaptive quantizing unit and controller, respectively. Since these components are equivalent to those indicated in FIG. 5, the description thereof will be omitted here. To be noted in the third embodiment is a selecting unit 17 which divides a block into a plurality of sub-blocks, and selects a quantization step on the basis of the minimum and maximum values in the dynamic range of each sub-block. As shown in FIG. 20, the selecting unit 17 includes the sub-formatting circuit 21 for dividing each block generated from the formatting circuit 1 into four sub-blocks, dynamic range detectors 41, 42, 43 and 44 which obtain the dynamic range (minimum and maximum values) of the respective sub-blocks, a minimum value detector 48 for detecting the minimum value of the outputs from the dynamic range detectors 41, 42, 48 and 44, a maximum value detector 48 for detecting the maximum value of the outputs from the detectors 41, 42, 43, and 44, a subtracter 47 for subtracting the output of the minimum value detector 45 from the output of the maximum value detector 48, and a control signal generator 48 which outputs a control signal for selecting a quantization step to the adaptive quantizing unit 12 on the basis of the outputs from the minimum value detector 45 and subtracter 47.

The coding apparatus according to the third embodiment will operate in the manner as described below. An image signal is divided into blocks of 8 picture elements×8 lines in the formatting circuit 1, and each block is further divided into four sub-blocks of 4 picture elements×4 lines, i.e., sub-blocks y1, y2, y3 and y4. The image signal in each sub-block y1, y2, y3 or y4 is expressed by y1 (i,j) , y2(i,j), y3(i,j), or y4(i,j)(i,j=1, 2, 3, 4). The dynamic range detectors 41, 42, 43 and 44 calculate and output respective dynamic ranges DR1, DR2, DR3 and DR4 of the sub-blocks as follows;

$$DR1 = MAX\{y1(i,j); i,j=1,2,3,4\} - MIN\{y1(i,j); i,j=1,2,3,4\}$$

$$DR2 = MAX\{y2(i,j); i,j=1,2,3,4\} - MIN\{y2(i,j); i,j=1,2,3,4\}$$

$$DR3 = MAX\{y3(i,j); i,j=1,2,3,4\} - MIN\{y3(i,j); i,j=1,2,3,4\}$$

$$DR4 = MAX\{y4(i,j); i,j=1,2,3,4\} - MIN\{y4(i,j); i,j=1,2,3,4\}$$

The minimum value detector 45 detects the minimum value D=MIN{DR1,DR2,DR3,DR4} of the outputs DR1, DR2, DR3, DR4 of the dynamic range detectors 41, 42, 43 and 44, and outputs the value D both to the subtracter 47 and to the control signal generator 48. On the other hand, the maximum value detector 46 detects and outputs the maximum value E=MAX{DR1,DR2,DR3,DR4} of the outputs DR1, DR2, DR3 and DR4 of the dynamic range detectors 41, 42, 43 and 44 to the subtracter 47. The subtracter 47 subtracts the minimum value D from the maximum value E thereby to obtain a value F=E−D which is outputted to the control signal generator 48. In the case where a small output D is generated from the minimum value detector 45, the block has the flat part whose degradation of image quality is readily noticed. In this case, the quantization table with high rate or the quantization table with medium rate should be used. On the other hand, if the subtracter 47 outputs a large output F, it means that the image changes greatly in the block, easily generating a quantization error at the decoder side. Therefore, when the output D is small and the output F is large, it is necessary to quantize with high rate.

Figure 21:
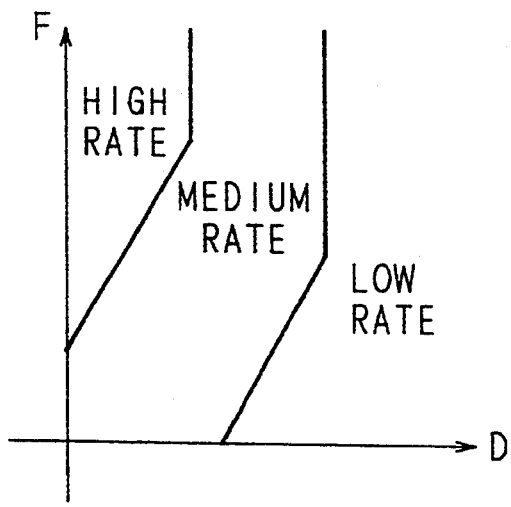
FIGS. 21 and 22 show diagrams explanatory of the operation of the selecting unit in the coding apparatus according to the third and sixth embodiments.
Figure 22:
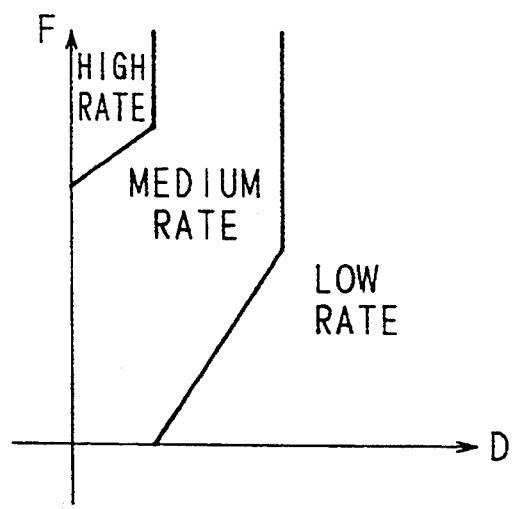

Depending on the outputs D and F(=E-D), the control signal generator 48 generates a control signal to the adaptive quantizing unit 12 on the basis of the selecting diagram of FIG. 21 or 22, thereby allowing the adaptive quantizing unit 12 to select the optimum quantization step. Now, the operation of the selecting unit 17 (control signal generator 48) will be concretely explained with reference to the diagram of FIG. 23, taking an example of the image block of FIG. 10.

Referring to FIG. 10(a), the dynamic range in each subblock is DRI=9, DR2=8, DR3=78 and DR4=114 in an example of an image signal quantized into 8 bits. In this case, D and F(=E−D) are respectively as follows;

D=MIN{DR1,DR2,DR3,DR4}=8

F=MAX{DR1,DR2,DR3,DR4}
−MIN{DR1,DR2,DR3,DR4}=106

Figure 23:
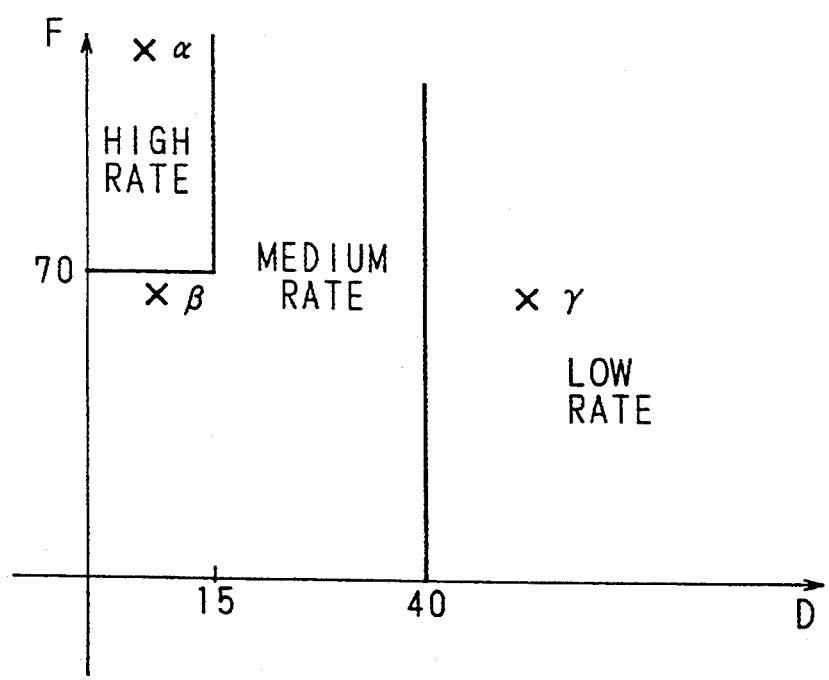
FIG. 23 shows a diagram of an example of selection in each image block of FIG. 10 according to the third and sixth embodiments.

According to a diagram of FIG. 23, this case coincides with a point α. Consequently, the selecting unit 17 selects the quantization table with high rate. On the other hand, in FIG. 10(b) wherein the dynamic range in each sub-block is DR1=8, DR2=7, DR3=64 and DR4=57, D and F being 7 and 57, it agrees with a point β in FIG. 23. The selecting unit 17 selects the quantization table with medium rate. Referring further to FIG. 10(c), the dynamic range in each sub-block is DR1=61, DR2=53, DR3=119 and DR4=119, D and F being 53 and 66, which coincides with a point γ in FIG. 23. Accordingly, the selecting unit 17 selects the quantization table with low rate.

The other components in the coding apparatus operate in the same way as in the first embodiment, and therefore the description thereof will be abbreviated.

Hereinbelow is described a coding apparatus according to a fourth embodiment of this invention.

Figure 24:
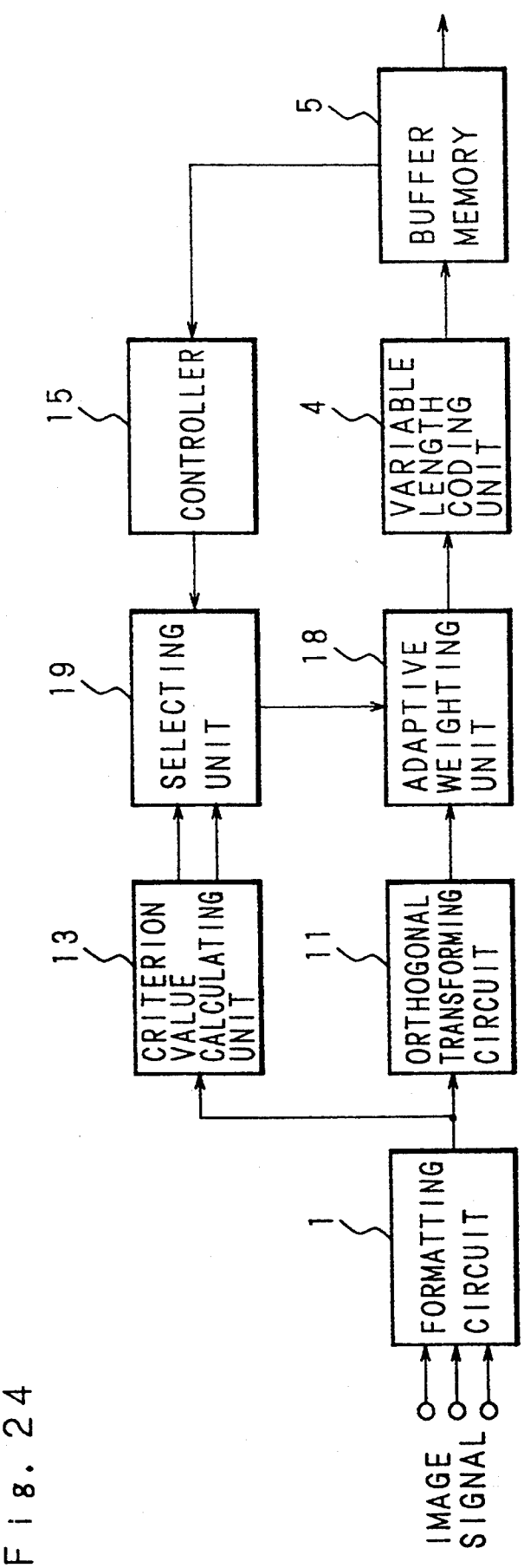
FIG. 24 shows a block diagram of the structure of coding apparatus according to the fourth embodiment of this invention.

In FIG. 24, the structure of a coding apparatus of the fourth embodiment is shown, in which components designated by references 1, 4, 5, 11, 13 and 15 are the formatting circuit, variable length coding unit, buffer memory, orthogonal trasforming circuit, criterion value calculating unit and controller, equivalent to those indicated in FIG. 5. The coding apparatus is further provided with an adaptive weighting unit 18 for performing adaptive weighting on the coefficients outputted from the orthogonal trasforming circuit 11 and a selecting unit 19 for selecting a weighting factor for the adaptive weighting unit 18 on the basis of an output from the criterion value calculating unit 13. The criterion value calculating unit 13 has the inner structure as shown in FIG. 6.

The coding apparatus according to this fourth embodiment will operate in the following manner.

Similar to the first embodiment, the maximum value A and subtracting value C obtained by the criterion value calculating unit 13 are inputted to the selecting unit 19 as the first and second criterion values, respectively. In correspondence to the criterion values A and C, the selecting unit 19 selects the weighting factor for the adaptive weighting unit 18 on the basis of the selecting diagram of FIG. 8 or 9. For example, the adaptive weighting unit 18 holds weighting factors of the following three kinds of rates.

$$W1(m,n) = 1$$

$$W2(m,n) = \frac{7 - m/2}{7} \times \frac{7 - n/2}{7}$$

$$W3(m,n) = \frac{7 - m}{7} \times \frac{7 - n}{7}$$

$$(m,n = 0, 1, 2, \ldots 7)$$

w1(m,n), W2(m,n) and W3(m,n) are respectively called as the weighting factor with high rate, the weighting factor with medium rate and the weighting factor with low rate. In the case where the first criterion value A is small, the block has a flat part which is easily noticed of the degradation of the image quality at the decoder side. In this case, weighting is performed with high or medium rate. If the second criterion value C is large, the image is greatly changed in the block, thereby bringing about quantization errors at the decoder side. Therefore, if the value A is small and the value C is large, adverse effects of the high spatial frequencies cannot be neglected. In such case, the weighting is performed with high rate.

With reference to the image block of FIG. 10, concrete explanation is made to the operation of the selecting unit 19. The selecting criterion of the high rate, medium rate and low rate is held the same as in the first embodiment (FIG. 11). FIG. 10(a) is the block with an image whose degradation of image quality is noticeable due to the expansion of quantization noises at the flat part. Therefore, weighting with high rate should be performed. Since this case is coincident with the point α in the diagram of FIG. 11, the selecting unit 19 selects the weighting factor W1(m,n) with high rate. Although weighting with low rate cannot be performed in the case of the block in FIG. 10(b) where the edge is found with not so high contrast in the flat background, quantization errors at the decoder side are small, and therefore weighting with medium rate is performed. This case coincides with the point β in FIG. 11, and accordingly the selecting unit 19 selects the weighting factor W2(m,n) with medium rate. In the meantime, the block in FIG. 10(c) has a strong change in contrast all thereover and the quantization errors are lard to be noticed. Therefore, weighting with low rate can be carried out, thereby enhancing the reduction rate. This case is coincident with the point γ in FIG. 11. The selecting unit 19 selects the weighting factor W3(m,n) with low rate.

Following the result of the selection by the selecting unit 19, the adaptive weighting unit 18 selects an appropriate weighting factor for each block, performing weighting on the coefficients outputted from the orthogonal transforming circuit 11 and outputting the weighting factor for each block and the coefficients subjected to weighting to the variable length coding unit 4. The output of the adaptive weighting unit 18 is variable-length-coded by the variable length coding unit 4 and then stored in the buffer memory 5. The data stored in the buffer memory 5 is read out at a fixed rate.

Meanwhile, the controller 15 detecting the amount of the data stored in the buffer memory 5 controls the selection of the weighting factor so that the buffer memory 5 does not overflow. In other words, in the case where the buffer memory 5 can afford a sufficient amount of capacity, the controller 15 arranges so that the weighting factor with high rate is selected much more, on the basis of the criterion, e.g., as indicated in the diagram of FIG. 8. On the contrary, if the buffer memory 5 is nearly saturated, the controller 15 arranges so that the weighting factor with low rate is more frequently selected, using the criterion, for example, as indicated in FIG. 9.

Similar to the first embodiment, according also to this fourth embodiment, since adjacent Picture elements in vertical direction are separated from each other in the event that the signal is processed in one field during the interlaced scanning, the first criterion value may be determined only by the difference of image signal level between adjacent picture elements in horizontal direction. In such case, the criterion value calculating unit 13 may be constituted as in FIG. 12.

Described hereinbelow is a coding apparatus according to a fifth embodiment of this invention.

Figure 25:
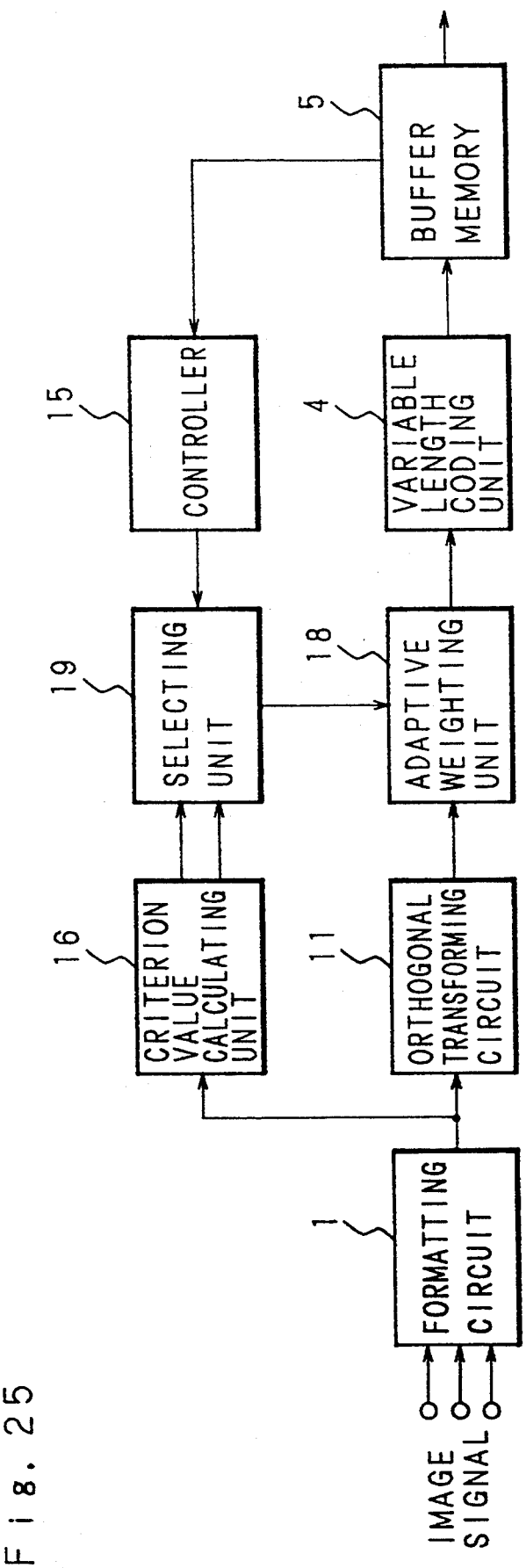
FIG. 25 shows a block diagram of the structure of a coding apparatus according to the fifth embodiment of this invention.

Although the second criterion value is the subtracting value C in the above-described fourth embodiment, the maximum value B may be employed for the second criterion value to select the weighting factor. That is, the maximum value B is used as the second criterion value according to the fifth embodiment. It is to be noted that the first criterion value according to the fifth embodiment is the minimum value A in the fourth embodiment as well. Referring now to FIG. 25 showing the structure of the coding apparatus of the fifth embodiment, numerals 1, 4, 5, 11, 15, 18 and 19 are the formatting circuit, variable length coding unit, buffer memory, orthogonal transforming circuit, controller, adaptive weighting unit and selecting unit, respectively, which are equivalent to those indicated in FIG. 24. Furthermore, a criterion value calculating unit designated by numeral 16 is equivalent to that unit 16 in the second embodiment shown in FIG. 14. According to this fifth embodiment, the selecting criterion of the weighting factor in the fourth embodiment is applied to the second embodiment. Therefore, the operation of the coding apparatus according to the fifth embodiment is easy to understand with reference to the description related to the second and fourth embodiments, and the detailed description of the fifth embodiment will be omitted here.

Now, a coding apparatus according to a sixth embodiment of this invention will be depicted.

Figure 26:
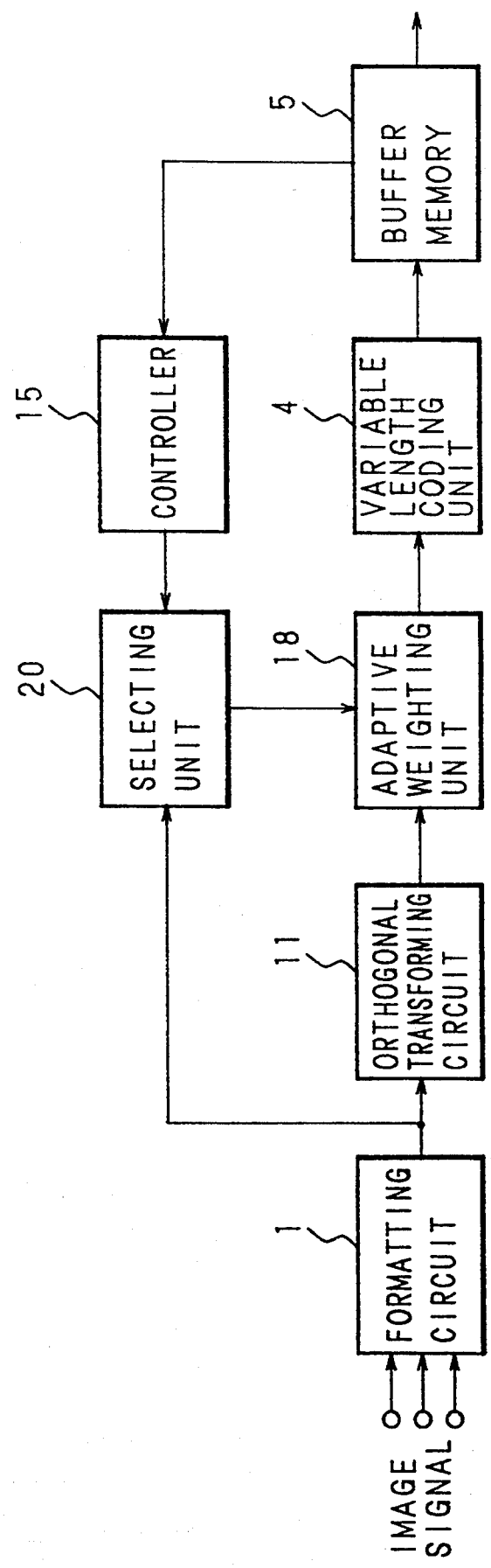
FIG. 26 shows a block diagram of the structure of a coding apparatus according to the sixth embodiment of this invention.

According to the sixth embodiment, the selecting criterion of the weighting factor for the adaptive weighting unit 18 in the fourth embodiment is applied to the earlier-described third embodiment. In the structure of the coding apparatus of the sixth embodiment shown in FIG. 26, numerals 1, 4, 5, 11, 15 and 18 designate the formatting circuit, variable length coding unit, buffer memory, orthogonal transforming circuit, controller and adaptive weighting unit. These components are equivalent to those shown in FIG. 24, and numeral 20 is a selecting unit equivalent to the selecting unit 17 in the third embodiment shown in FIG. 20. Accordingly, the operation of the coding apparatus according to the sixth embodiment can be readily understood from the description related to the third and fourth embodiments, and therefore the detailed description of the sixth embodiment will be abbreviated here.

It is to be noted, however, that although each one block is divided into four sub-blocks in any of the foregoing embodiments, it is not necessarily required to divide the block into four, but the number of the subblocks may be decided depending on the size or the like of the block.

Moreover, in selecting the quantization step or weighting factor, two kinds of the criterion values are used in the foregoing embodiments. However, n kinds ($n \geq 1$) of criterion values may be employed. In the case where n is equal to 1, for example, the absolute value sum of the difference of image signal level between adjacent picture elements in horizontal and vertical directions in the subblock may be used as the criterion value, and on the basis of which the quantization step or weighting factor may be selected.

A coding apparatus according to seventh embodiment of this invention is as follows.

Figure 27:
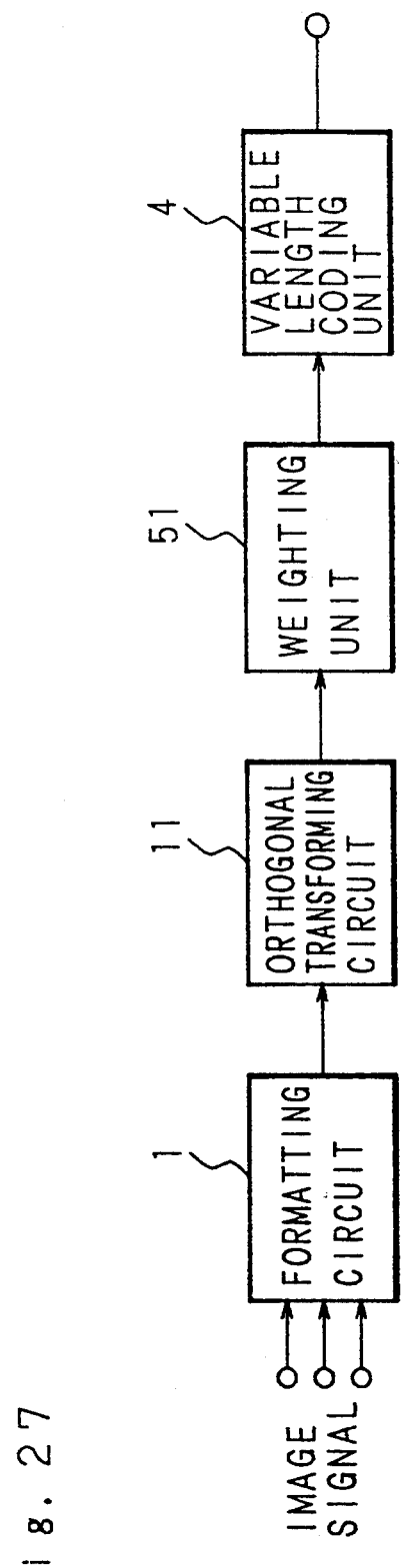
FIG. 27 shows a block diagram of the structure of a coding apparatus according to the seventh embodiment of this invention.
Figure 28:
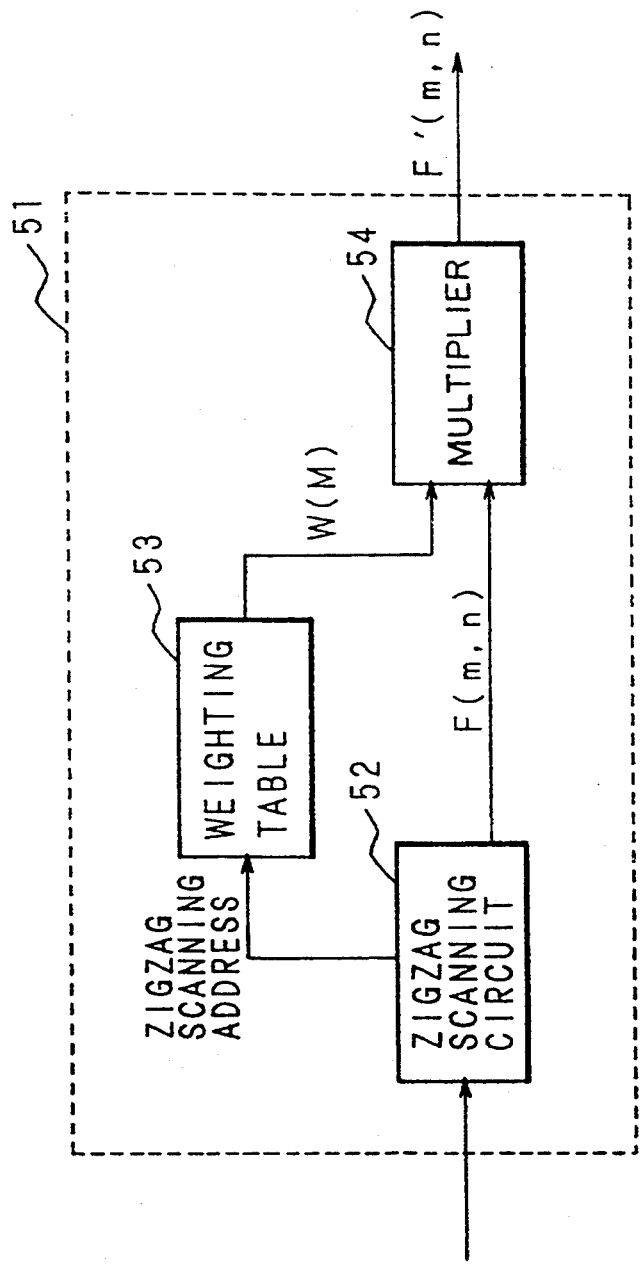
FIG. 28 shows a block diagram of the structure of a weighting unit in the coding apparatus according to the seventh embodiment.

Referring to FIG. 27 which shows the structure of a coding apparatus of the seventh embodiment, the coding apparatus is provided with the formatting circuit 1, the orthogonal transforming circuit 11, a weighting unit 51 for performing weighting on coefficients outputted from the circuit 11, and the variable length coding unit 4. The weighting unit 51 is comprised of a zigzag scanning circuit 52 which scans zigzag the picture elements in the block, a weighting table 53 accommodating a plurality of weighting factors therein, and a multiplier 54 for multiplying the coefficients by a weighting factor, as shown in FIG. 28.

The coding apparatus in the above-described structure will operate in the manner described hereinbelow. The inputted digital image signal is subjected to time-division multiplex in the formatting circuit 1 into blocks of plurality of picture elements. The block outputted from the circuit 1 is subjected to orthogonal transform, e.g., DCT or the like in the orthogonal transforming circuit 11. The orthogonal transforming circuit 11 outputs coefficients, on which are performed weighting in the weighting unit 51. The output of the weighting unit 51 is variable-length-coded by the variable length coding unit 4.

Figure 29:
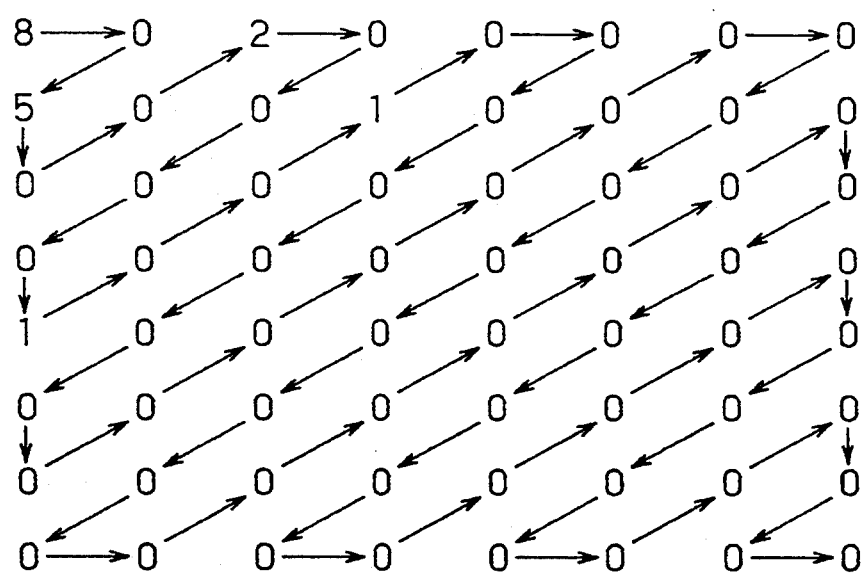
FIG. 29 shows a conceptional view of the operation during zigzag scanning according to the seventh embodiment.

The operation of the above weighting unit 51 will particularly be described in detail. In the case, for instance, where the formatting circuit 1 generates a block consisting of 8 picture elements × 8 lines (image signal $x(i,j)$) ($i, j = 0, 1, \ldots, 7$), the orthogonal transforming circuit 11 outputs 8×8 coefficients $F(m,n)$ ($m,n = 0, 1, \ldots, 7$). These coefficients are arranged in a one-dimensional row of data by the zigzag scanning circuit 52 having a zigzag scanning characteristic shown in FIG. 29. Then, the coefficients $F(m,n)$ are outputted from the circuit 52 to the multiplier 54 in the scanning order. At the same time, the zigzag scanning circuit 52 outputs zigzag scanning address data for every row of data, thereby allowing access to the weighting table 53. The weighting table subsequently generates a weighting factor W for the data outputted from the zigzag scanning circuit 52 to the multiplier 54.

Figure 30A:
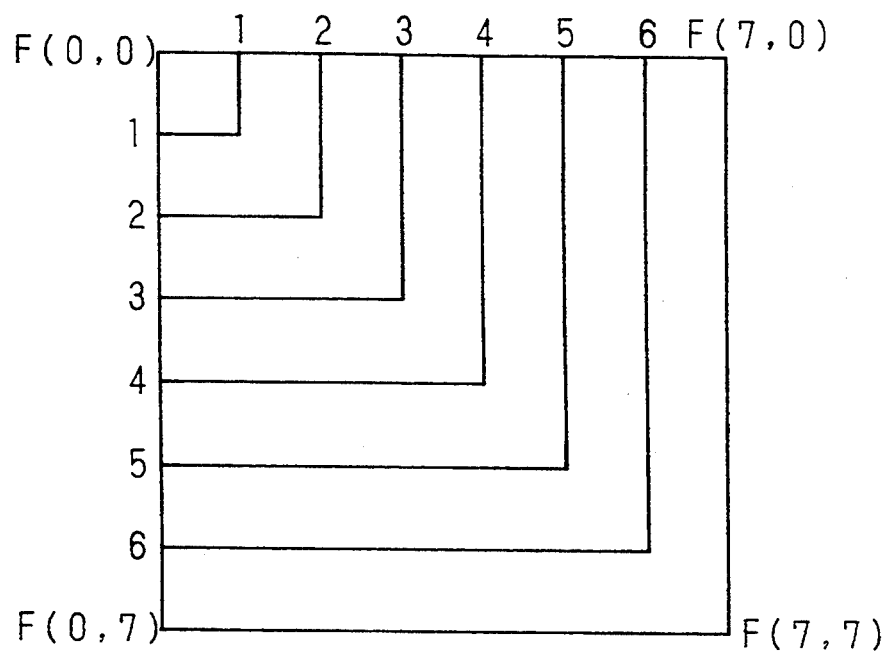
FIGS. 30A-30B shows a conceptional view of an example of a weighting factor according to the seventh embodiment.
Figure 30B:
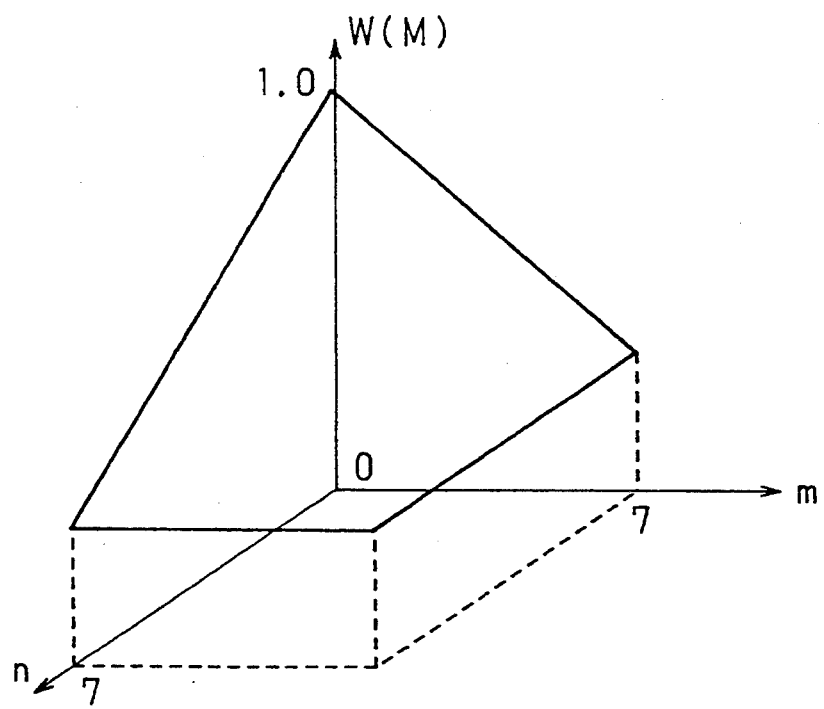

The weighting factor is determined, for example, by 8 kinds of multipliers as shown in FIG. 30. Concretely, the weighting factor W is expressed by the following equation with the use of the maximum value $M = \mathrm{MAX}\{m,n\}$ ($m,n = 0, 1, \ldots, 7$) of a sequency degree m in horizontal direction and a sequency degree n in vertical direction;

$$W(M) = \frac{7 - M(1 - \alpha)}{7} \qquad (0 < \alpha \leq 1)$$

Both the coefficients $F(m,n)$ outputted from the zigzag scanning circuit 52 and weighting factor $W(M)$ outputted from the weighting table 53 are inputted to the multiplier 54, where the coefficients are subjected to weighting in the following manner;

$$F(m,n) = F(m,n) \times W(M)$$

Figure 31:
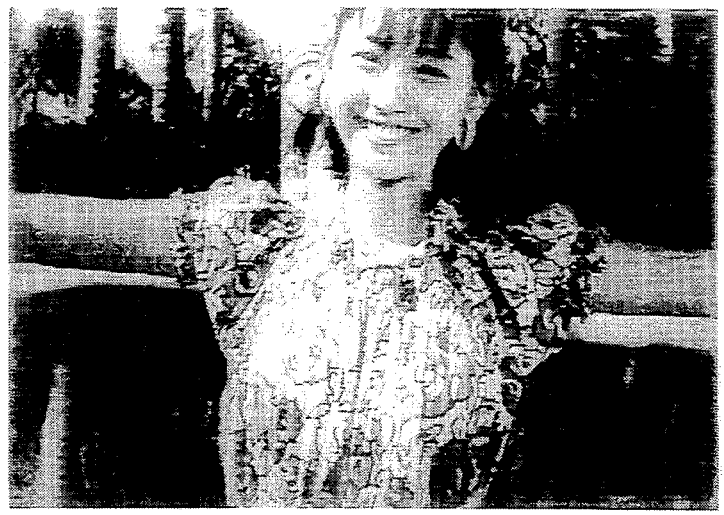
FIG. 31 shows a photograph of an example of an image.
Figure 33:
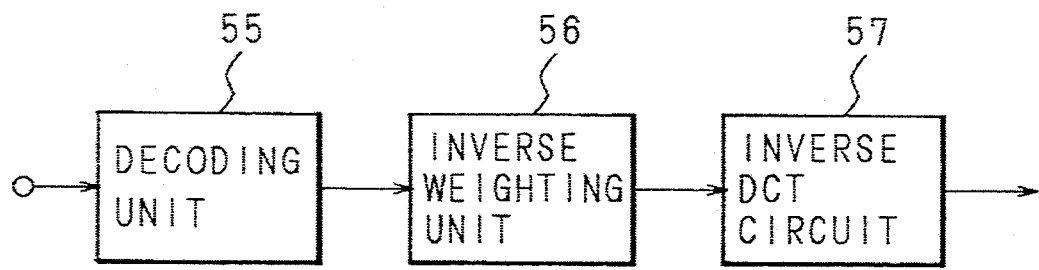
FIG. 33 shows a block diagram of the structure of a decoding apparatus for decoding the data coded by the coding apparatus of the seventh embodiment.

In order to explain the operation of the weighting unit 51 in a more concrete fashion, a 4:2:2 component digital image data (the data amount is 166 Mbps) shown in FIG. 31 which is quantized to 8 bits by 13.5 MHz is taken as an example. Supposing that 64 coefficients $F(m,n)$ subjected to DCT for the block of 8 picture elements × 8 lines are performed weighting with $\alpha = 0.6$ and the DCT coefficients $F'(m,n)$ after being performed weighting thereon are run-length-coded in accordance with a bit map table of FIG. 32, and when the amount of the data is calculated, the image data has 54.7 Mbps. As for a decoding system, as shown in FIG. 33, the DCT coefficients $F'(m,n)$ which are coded after being subjected to weighting are decoded at a decoding unit 55 and further subjected to inverse weighting by an inverse weighting unit 56. The coefficients F'(m,n) are multiplied by a reciprocal number of the weighting factor W(M), thereby obtaining F''(m,n).

$$F''(m,n) = F'(m,n) \times 1/W(M)$$

Thereafter, an inverse DCT circuit 57 performs inverse DCT on F''(m,n), so that the image x1(i,j) is reproduced. If the S/N ratio in one block of the reproduced image x1(i,j) is defined as described below, Y signal has 43.5 dB, R-Y 44.6 dB and B-Y 45.0 dB, respectively with respect to a sample image of FIG. 31;

$$S/N \text{ ratio} = 10 \log_{10} \left( \frac{255^2}{\frac{1}{64} \sum_{i=0}^{7} \sum_{j=0}^{7} \{x(i,j) - x_1(i,j)\}^2} \right)$$

On the other hand, in the case of the prior art and when $\alpha = 0.7$, the data amount is 54.8 Mbps, and Y signal has the S/N ratio 43.5 dB, R-Y 44.6 dB and B-Y 45.0 dB, resulting in the similar effect as exerted by this invention. However, the weighting unit in the prior art necessitates 64 weighting factors, and therefore 64 ROM'S are needed to perform multiplication of the 64 weighting factors.

According to the foregoing embodiment, the weighting unit has 8 kinds of weighting factors based on the maximum value of the sequency degrees in horizontal and vertical directions. However, it is not necessary to select the weighting factor on the basis of the maximum value of the sequency degrees in horizontal and vertical directions, but may be possible to select the weighting factor in the order of the zigzag scanning indicated in FIG. 29.

Figure 34:
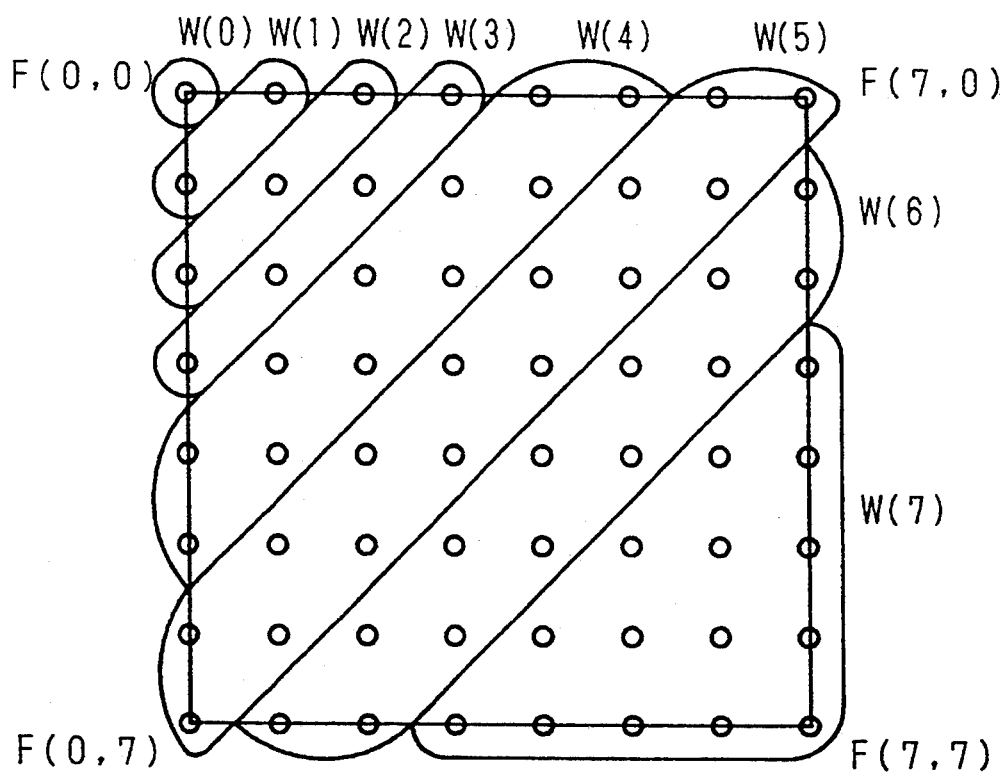
FIGS. 34 and 35 show conceptional views of another example of a weighting factor according to in the seventh embodiment.

In such case as above, since scanning is repeated in a slantwise direction during the zigzag scanning, it should be so arranged that the same weighting factor is selected within the smallest range of scanning in the slantwise direction. Thus, 8 kinds of the weighting factors are prepared in total. By way of example, for performing weighting on the DCT coefficients F(m,n), weighting factors W(s) below are satisfactory, as is understood from FIG. 34.

$$W(s) = \frac{7 - s(1 - \alpha)}{7} \quad (0 < \alpha \leq 1)$$

Figure 35:
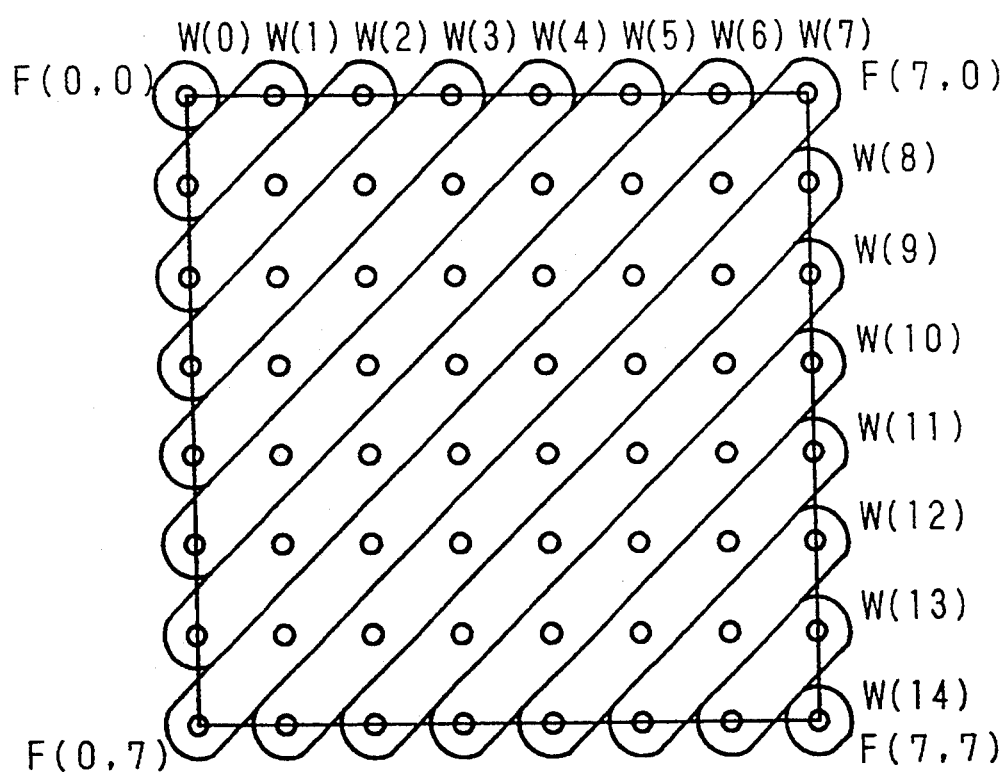
Figure 36:
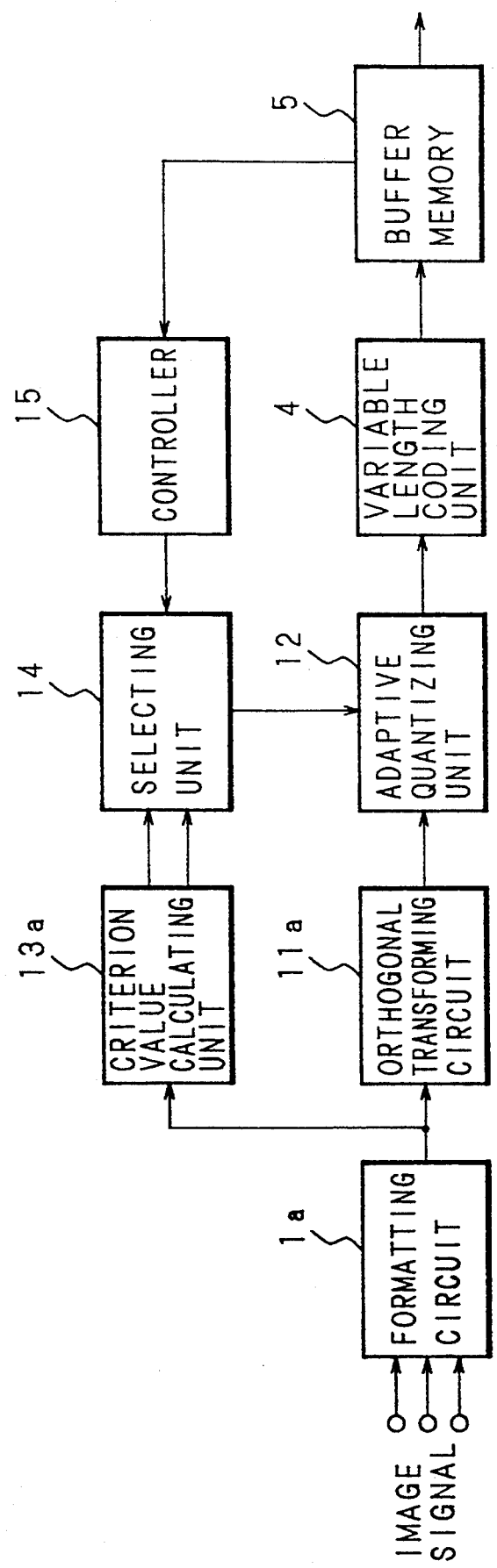
FIG. 36 shows a block diagram of the structure of the coding apparatus when applied for three-dimensional blocks.

$s = 0 (m + n = 0)$  $\quad s = 1 (m + n = 1)$
$s = 2 (m + n = 2)$  $\quad s = 3 (m + n = 3)$
$s = 4 (4 \leq m + n \leq 5)$  $\quad s = 5 (6 \leq m + n \leq 7)$
$s = 6 (8 \leq m + n \leq 9)$  $\quad s = 7 (10 \leq m + n \leq 14)$ Although there are 8 kinds of weighting factors used in the foregoing embodiment, it is not necessarily to be 8, but kinds of weighting factors may be used at the most. As shown in FIG. 35, 15 kinds of the weighting factors W(s) are obtained as follows;

$$W(s) = \frac{14 - 2(1 - \alpha)}{14} \quad (0 < \alpha \leq 1)$$

$s = i + j \quad (0 \leq s \leq 14)$

Furthermore, although the foregoing description of the seventh embodiment is related to weighting in a two-dimensional plane, weighting can be performed by a unit of the two-dimensional plane also for a three-dimensional block.

Since the number of weighting factors multipliers of the weighting unit is set to be not larger than $N^2/4$ for $N \times N$ blocks in the seventh embodiment, the reduction rate of data can be kept equivalent to that of the coding apparatus using the conventional weighting unit, whereby the coding apparatus of this invention is easy to be a hardware. In any of the embodiments described above, the image signal outputted from the formatting circuit is divided into blocks consisting of 8 picture elements × 8 lines. However, this invention is not restricted to such two-dimensional block (horizontal and vertical directions), and is applicable also to a three-dimensional block (horizontal, vertical and time directions).. Accordingly, such example of application will be described hereinbelow.

An embodiment applied to a three-dimensional block which is corresponding to the first embodiment will be given. Referring to a block diagram of FIG. 38, a formatting circuit 1a divides an inputted digital image signal into a plurality of three-dimensional blocks each consisting of 8 picture elements × 8 lines × 8 fields. An orthogonal transforming circuit 11a performs three-dimensional DCT to each block outputted from the formatting circuit 1a. Each block divided by the circuit 1a is further divided into a plurality of sub-blocks in a criterion value calculating unit 13a. The criterion value calculating unit 13a operates and outputs criterion values for a quantization step. The other parts in the constitution of the coding apparatus are the same as in the first embodiment, and therefore the corresponding parts are designated by the same reference numerals, description thereof being abbreviated.

Figure 37:
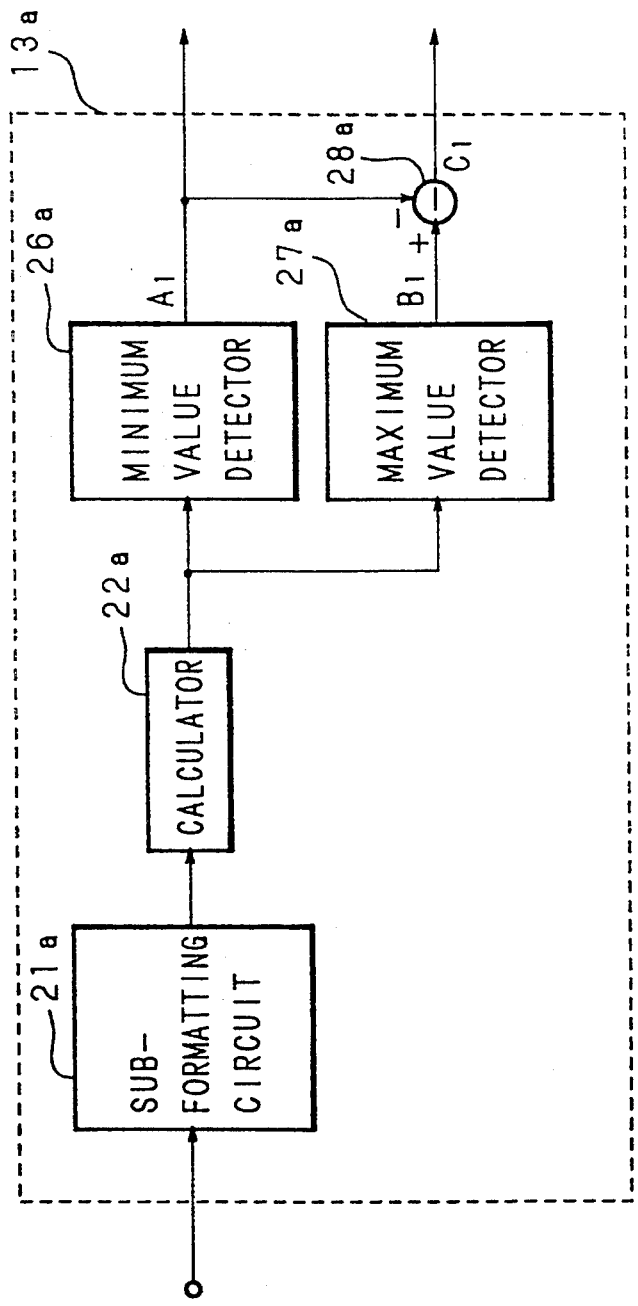
FIG. 37 shows a block diagram of the structure of an example of a criterion value calculating unit of the coding apparatus shown in FIG. 36.

In FIG. 37, the criterion value calculating unit 13a is comprised of a sub-formatting circuit 21a for dividing each block obtained by the formatting circuit 1a into, for example, 32 sub-blocks (one sub-block is made of 4 picture elements × 4 lines), a calculator 22a for obtaining the absolute value sum of difference of image signal level between adjacent picture elements in horizontal and vertical directions in each sub-block, a minimum value detector 26a for detecting the minimum value A1 among 32 values outputted successively from the calculator 22a, a maximum value detector 27a for detecting the maximum value B1 among the 32 values, and a subtracter 28a for subtracting the output A1 of the minimum value detector 26a from the output B1 of the maximum value detector 27a. From the criterion value calculating unit 13a, the output A1 is generated as a first criterion value, and an output C1 (=B1−A1) of the subtracter 28a is generated as a second criterion value, to the selecting unit 14.

Figure 38:
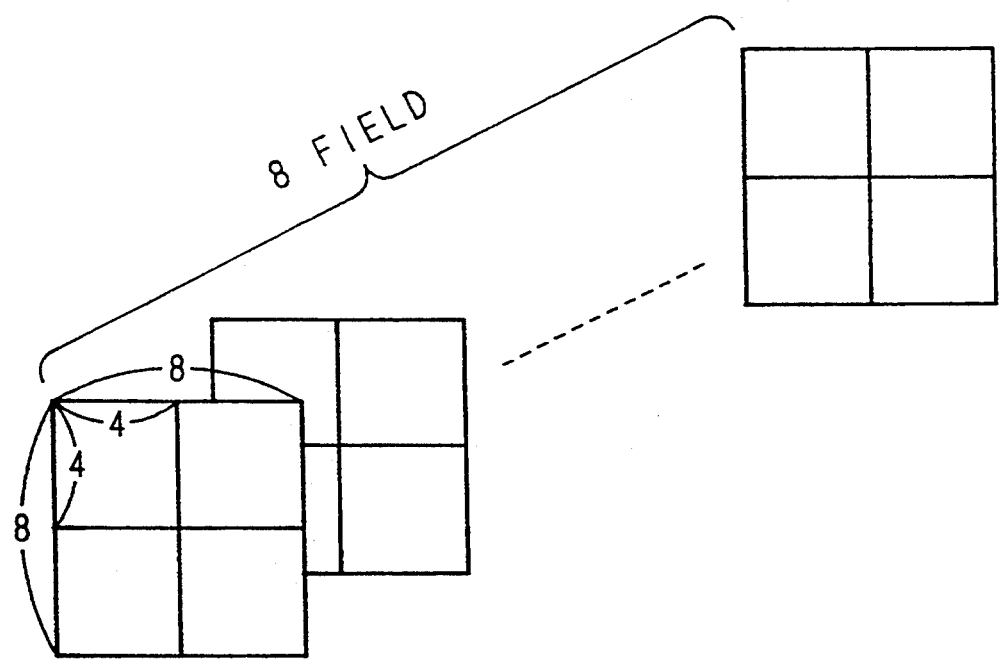
FIG. 38 shows a diagram how to divide the three-dimensional block into sub blocks.

The operation of this coding apparatus is as follows. The digital image signal inputted to the formatting circuit 1a is divided into blocks each consisting of 8 picture elements × 8 lines × 8 fields. The divided block is outputted to the orthogonal transforming circuit 11a and criterion value calculating unit 13a. As indicated in FIG. 38, each block consisting of 8 picture elements × 8 lines × 8 fields outputted from the formatting circuit 1 is divided into four sub-blocks each consisting of 4 picture elements × 4 lines per each field in the sub-formatting circuit 21a. Therefore, 32 sub-blocks are formed in total. In this case, supposing that the image signal in each subblock is expressed by y(i,3) (i,j = 1, 2, 3, 4,), the calculator 22a operates the absolute value sum Vn (n=1, 2, ..., 32) of difference of image signal level between adjacent picture elements in horizontal and vertical directions in the sub-block on the basis of the following equation;

$$Vn = \sum_{j=1}^{4} \sum_{i=1}^{3} |y(i,j) - y(i+1,j)| + \sum_{i=1}^{4} \sum_{j=1}^{3} |y(i,j) - y(i,j+1)|$$

Subsequently, the minimum value detector 26a detects the minimum value A1 of the 32 Vn for the 32 sub-blocks successively outputted from the calculator 22a, and outputs the minimum value A1 to the selecting unit 14 as the first criterion value to select the quantization step, with outputting the same to the subtracter 28a. Meanwhile, the maximum value detector 27a detects and outputs the maximum value B1 of the 32 values Vn successively generated from the calculator 22a to the subtracter 28a. The subtracter 28a obtains the difference C1 by subtracting A1 from B1 and outputs the value C1 to the selecting unit 14 as the second criterion value for selecting the quantization step.

The subsequent operation is carried out in the same manner as in the first embodiment, and the description thereof will be omitted therefore.

In the modified embodiment above corresponding to the first embodiment, although the three-dimensional block is constructed by forming two-dimensional blocks per each field and bundling the two-dimensional blocks of a plurality of the fields, it may be possible to form the three-dimensional block by constituting the two-dimensional blocks per each frame and bundling the blocks of a plurality of the frames.

Moreover, in addition to the foregoing modification of the first embodiment, another modified embodiments respectively corresponding to the second, third, fourth, fifth and sixth embodiments can be devised by forming a three-dimensional block with adjacent picture elements in horizontal, vertical and time directions and dividing the block into sub-blocks in each second-dimensional plane as shown in FIG. 38. Since the constitution and operation of the coding apparatus of the modified embodiments would be easily understood with reference to the corresponding embodiments, the description thereof will be abbreviated here.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A coding apparatus for reducing a digital image signal, comprising:
   block formatting means for dividing the digital image signal into blocks of a plurality of picture elements;
   transforming means for transforming the blocks of plurality of picture elements into a plurality of coefficients;
   quantizing means for quantizing the plurality of coefficients with a quantization table;
   means for dividing each block of the digital image signal into a plurality of sub-blocks and for obtaining a plurality of indexes, each index indicating a degree of change between the picture elements in a sub-block of the plurality of sub-blocks; and
   means for obtaining a maximum index and a minimum index from the plurality of indexes, wherein the quantization table is determined from the maximum index and the minimum index.

2. The coding apparatus of claim 1, further including means for obtaining a difference between the maximum index and the minimum index.

3. The coding apparatus of claim 2, further including means for obtaining the quantization table from a plurality of quantization tables according to the minimum index and the difference.

4. The coding apparatus of claim 3, wherein the means for obtaining the quantization table includes
   means for selecting a first quantization table when a combination of the minimum index and the difference are within a first predetermined range of combinations;
   means for selecting a second quantization table when a combination of the minimum index and the difference are within a second predetermined range of combinations; and
   means for selecting a third quantization table when a combination of the minimum index and the difference are within a third predetermined range of combinations.

5. The coding apparatus of claim 1, wherein the means for dividing and obtaining includes
   means for calculating differences between adjacent picture elements of each sub-block.

6. The coding apparatus of claim 5, wherein the means for dividing and obtaining further includes
   means for calculating a sum of the absolute values of the calculated differences.

7. The coding apparatus of claim 6, wherein the adjacent picture elements are adjacent in one of the horizontal and the vertical direction.

8. A coding apparatus for reducing a digital image signal, comprising:
   a block formatting circuit for dividing the digital image signal into blocks of a plurality of picture elements;
   a transforming circuit for transforming the blocks of plurality of picture elements into a plurality of coefficients;
   quantizing circuit for quantizing the plurality of coefficients with a quantization table;
   a calculating circuit that divides each block of the digital image signal into a plurality of sub-blocks and obtains a plurality of indexes, each index indicating a degree of change between the picture elements in a sub-block of the plurality of sub-blocks; and
   a detecting circuit that obtains a maximum index and a minimum index from the plurality of indexes, wherein the quantization table is determined according to the maximum index and the minimum index.

9. The coding apparatus of claim 8, further including a subtracting unit that obtains a difference between the maximum index and the minimum index.

10. The coding apparatus of claim 9, further including a selecting unit that obtains the quantization table from a plurality of quantization tables according to the minimum index and the difference.

11. The coding apparatus of claim 10, wherein the selecting unit includes
- means for selecting a first quantization table when a combination of the minimum index and the difference are within a first predetermined range of combinations;
- means for selecting a second quantization table when a combination of the minimum index and the difference are within a second predetermined range of combinations; and
- means for selecting a third quantization table when a combination of the minimum index and the difference are within a third predetermined range of combinations.

12. The coding apparatus of claim 8, wherein the calculating circuit includes
- means for calculating differences between adjacent picture elements of each sub-block.

13. The coding apparatus of claim 12, wherein the calculating circuit further includes
- means for calculating a sum of the absolute values of the differences.

14. The coding apparatus of claim 13, wherein the adjacent picture elements are adjacent in one of the horizontal and the vertical direction.

15. A method for reducing a digital image signal, the method comprising the steps of:
- (A) dividing the digital image signal into blocks of a plurality of picture elements;
- (B) transforming the blocks of plurality of picture elements into a plurality of coefficients;
- (C) quantizing the plurality of coefficients with a quantization table;
- (D) dividing each block of the digital image signal into a plurality of sub-blocks and obtaining a plurality of indexes, each index indicating a degree of change between the picture elements in a sub-block of the plurality of sub-blocks; and
- (E) obtaining a maximum index and a minimum index from the plurality of indexes, wherein the quantization table is determined according to the maximum index and the minimum index.

16. The method of claim 15, further including the step of obtaining a difference between the maximum index and the minimum index.

17. The method of claim 16, further including the step of obtaining the quantization table from a plurality of quantization tables according to the minimum index and the difference.

18. The method of claim 17, wherein the step of obtaining the quantization table includes the steps of
- selecting a first quantization table when a combination of the minimum index and the difference are within a first predetermined range of combinations;
- selecting a second quantization table when a combination of the minimum index and the difference are within a second predetermined range of combinations; and
- selecting a third quantization table when a combination of the minimum index and the difference are within a third predetermined range of combinations.

19. The method of claim 15, wherein step (D) includes the step of
- calculating differences between adjacent picture elements of each sub-block.

20. The method of claim 19, wherein step (D) further includes the step of
- calculating a sum of the absolute values of the differences.

21. The method of claim 20, wherein the adjacent picture elements are adjacent in one of she horizontal and the vertical direction.

* * * * *